United States Patent
Nakamura et al.

(10) Patent No.: US 8,253,107 B2
(45) Date of Patent: Aug. 28, 2012

(54) NEUTRON IMAGE DETECTING METHOD AND NEUTRON IMAGE DETECTOR USING ITS METHOD

(75) Inventors: Tatsuya Nakamura, Tokai (JP); Masaki Katagiri, Tokai (JP); Masumi Ebine, Tokai (JP); Atsushi Birumachi, Tokai (JP); Yutaka Yoribayashi, Kawasaki (JP)

(73) Assignees: Japan Atomic Energy Agency, Ibaraki (JP); Hoshin Electronics Co., Ltd., Kanagawa (JP)

( * ) Notice: Subject to any disclaimer, the term of this patent is extended or adjusted under 35 U.S.C. 154(b) by 33 days.

(21) Appl. No.: 13/035,248

(22) Filed: Feb. 25, 2011

(65) Prior Publication Data

US 2011/0284750 A1  Nov. 24, 2011

(30) Foreign Application Priority Data

Feb. 26, 2010  (JP) ................................. 2010-042209

(51) Int. Cl.
*G01T 1/10*  (2006.01)
(52) U.S. Cl. ........................................................ 250/362
(58) Field of Classification Search .................. 250/362, 250/366, 390.01–390.12
See application file for complete search history.

(56) References Cited

U.S. PATENT DOCUMENTS

| 3,725,657 A * | 4/1973 | Laney ............................ 250/362 |
| 2011/0024634 A1* | 2/2011 | Shah et al. .................... 250/362 |

FOREIGN PATENT DOCUMENTS

| JP | 2000-187077 | 7/2000 |
| JP | 2002-071816 | 3/2002 |
| JP | 2009-008675 | 1/2009 |

OTHER PUBLICATIONS

Kei-Ichi Kuroda et al., "Poissonian-type new radiation imager", Nuclear Instruments and Methods in Physics Research A 430, pp. 311-320, 1999.

* cited by examiner

*Primary Examiner* — Kiho Kim
(74) *Attorney, Agent, or Firm* — Brundidge & Stanger, P.C.

(57) ABSTRACT

A neutron image detection method is disclosed, which collects a fluorescent light generated by a neutron incident at a designated position interval in one-dimensional geometry and determines an incident position of the neutron by detecting the collected fluorescent light, in which the fluorescent light is detected by a photon counting method; a pulse signal generated by an individual output photon is extracted on the basis of a clock signal generated with the same time interval as the time width of the pulse signal generated by a single photon; a count-value distribution is obtained in terms of incident position as variable determined by a single neutron incident by counting the pulse signal output; and a neutron incident position is determined by calculating a median point on the basis of the obtained count-value distribution.

11 Claims, 40 Drawing Sheets

FIG. 13

| PROCESS MODE | PHOTON NUMBERS | POSITION RESOLUTION IN mm |
|---|---|---|
| MEDIAN POINT CALCULATION 0 | 2 | 1.04 |
| MEDIAN POINT CALCULATION 1 | 3 | 0.97 |
| MEDIAN POINT CALCULATION 2 | 4 | 0.92 |
| MEDIAN POINT CALCULATION 3 | 5 | 0.87 |
| MEDIAN POINT CALCULATION 4 | 6 | 0.84 |
| MEDIAN POINT CALCULATION 5 | 7 | 0.81 |
| PATTERN MATCHING METHOD | 4 | 1.08 |

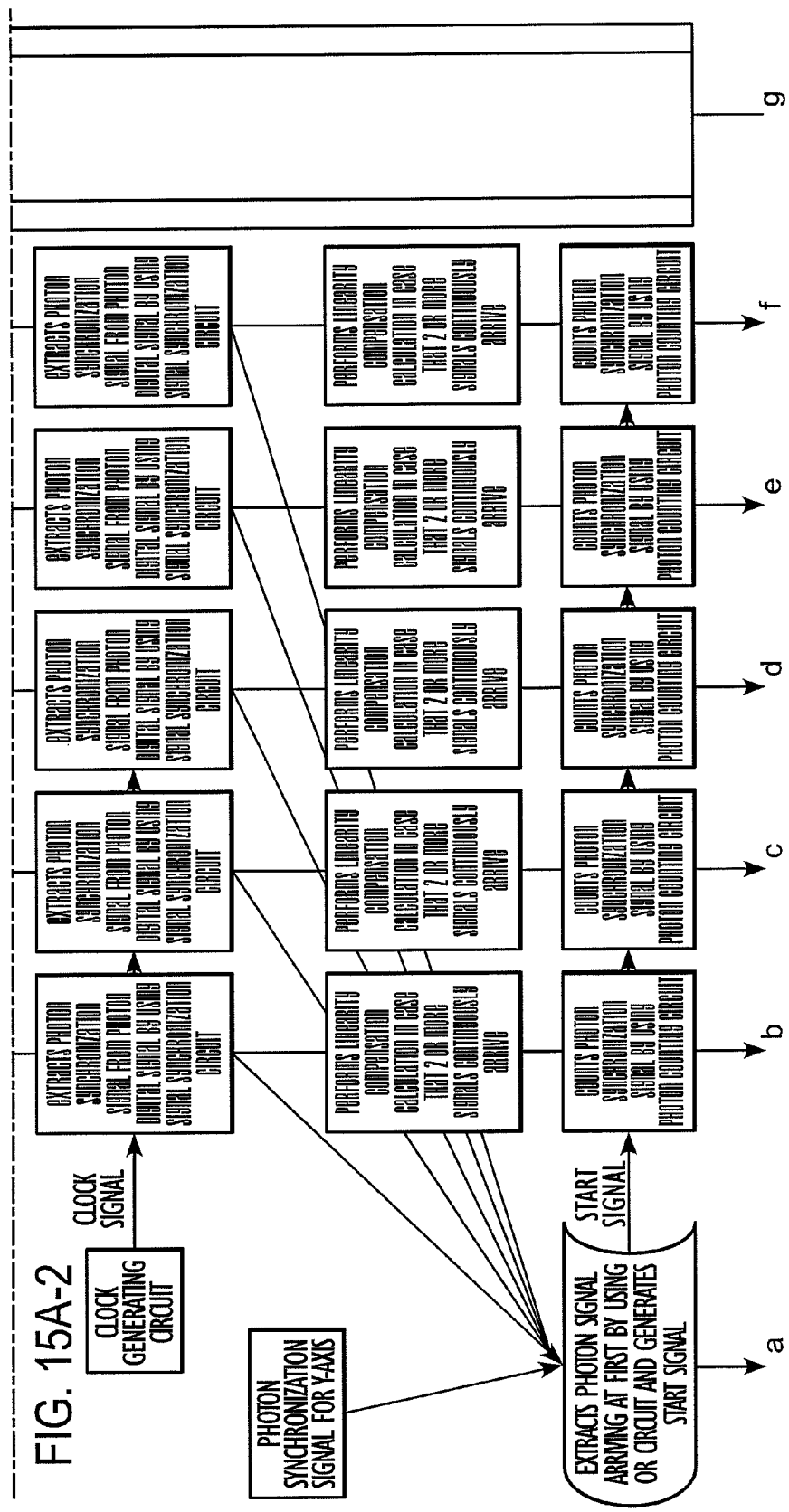

NEUTRON IMAGE DETECTING METHOD AND NEUTRON IMAGE DETECTOR USING ITS METHOD

BACKGROUND OF INVENTION

The present invention relates to a neutron image detecting method for creating one-dimensional or two-dimensional neutron images at a high speed and with increased position accuracy, and relates to a neutron image detector using this method. The present invention can be applied to various purposes for the measurement of intense pulsed neutrons in a high-intensity photon accelerator facility (e.g. J-PARC), the evaluation of various dynamic behaviors in nuclear reactors and fusion reactors, the non-destructive inspection using high permeability of neutrons, and the physical property measurement of new materials.

As for the two-dimensional neutron image detector used for neutron scattering experiments using neutron sources generated by a nuclear reactor or an accelerator, what have been used include such a detector as being formed by combining a neutron scintillator or a fluorescent neutron detecting sheet formed together with a fluorescent material and a neutron convertor with a wavelength shifting fiber (refer to Patent Literatures 1 and 2, and Non-Patent Literature 1). Such two-dimensional image detector is characterized in that the position information is obtained by using a cross-fiber reading method, including proven methods such as a method for determining the incident position by using a coincidence counting method using such a sheet configuration that a couple of wavelength shifting fiber bundles are arranged diagonally on the upper surface and the bottom surface of the fluorescent material sheet or the scintillator plate, a method for determining the incident position by using a coincidence counting method using such a sheet configuration that couple of wavelength shifting fiber bundles are arranged diagonally on the back surface of the scintillator by improving the cross-fiber reading method, and a method using such a sheet configuration that a couple of wavelength shifting fiber bundles are arranged diagonally and that scintillators are arranged on its upper surface and bottom surface.

In relation to the method for determining the incident position of neutrons by using a median point calculating method in the same way as the present invention, what is known as Anger-type camera method uses such a method in that gamma-rays or fluorescent lights from the neutron scintillator are detected directly by a number of photomultiplier tubes, and the incident position is determined by a median point calculating method on the basis of the digitized values of the fluorescent light intensity by using Analog/Digital Converter (hereinafter referred to as ADC) (for example, refer to Patent Literature 3).

[Patent Literature 1] JP 2000-187007 A
[Patent Literature 2] JP 2002-71816 A
[Patent Literature 3] JP 2009-8695 A
[Non-Patent Literature 1] Nucl. Instr. and Meth., A439 (1999) PP. 311-320.

SUMMARY OF INVENTION

In those conventional two-dimensional image detectors, the fluorescent light emitted from the scintillator is converted to the electric signal by the photomultiplier tube, and then the analog pulse signal is output after amplifying the integrated signal waveform by using the waveform shaping amplifier, and the peak value of the obtained analog pulse signal waveform is digitized, and the position showing the maximum value at the corresponding optical fiber or wavelength shifting fiber is finally determined to be the incident position. As those conventional detectors requires ADC circuit for obtaining the digital values, there is such a disadvantage that the signal processing circuit becomes complicated and requires an extraordinary high cost.

In those conventional one-dimensional detectors, one-dimensional neutron image is obtained in that the fluorescent light emitted from the scintillators each separated at regular intervals by reflecting plates are made led into the photomultiplier tubes by using the optical fibers, and then the signal induced by the fluorescent light is made integrated, and finally the signal having a signal value equal to or larger than the predetermined value is counted to be identifying a single neutron incident.

In those neutron image detectors, as there is no boundary between adjacent pixels due to their configuration in which the wavelength shifting fibers are arranged on a plane, and, in case of using optical fibers, as the fluorescent lights emitted from the fluorescent light sheet are leaked at the gaps at the reflecting plates and made scattered and diffused, and then are incident into two or more wavelength shifting fibers or optical fibers, uncommon circuit technology is required to determine the exact incident position. Thus, as described above, ADC circuit is required principally to determine the incident position, and, there is resultantly such a disadvantage that the signal processing circuit becomes complicated and requires an extraordinary high cost. In addition, the accuracy in determining the incident position is not satisfactory.

The light transmission efficiency is several percent when the fluorescent light emitted from the scintillator is transmitted through the wavelength shifting fiber or the optical fiber to the photomultiplier tube. This requires a number of photons sufficiently enough to shape and amplify the waveform of the signal from the photomultiplier tube, and convert the amplified waveform into the digital signal by using ADC circuit, which may lead to such a disadvantage that the detection efficiency for neutrons decreases.

In order to redeem those disadvantages, a method for determining the incident position of neutron by using a pattern of the photon signals output from the individual wavelength shifting fibers by using a photon counting method is developed and used, which still have such a problem that the exact incident position of neutron can not determined precisely.

In addition, in the above described method in that gamma-rays or fluorescent lights from the neutron scintillator are detected directly by a number of photomultiplier tubes, and the incident position is determined by a median point calculating method on the basis of the digitized values of the fluorescent light intensity by using ADC, as ADC is required to be used for obtaining the digital value, there is such a disadvantage that the signal processing circuit becomes complicated and requires an extraordinary high cost.

One aspect of the neutron image detection method or the neutron image detector based on this method according to the present invention is based on the concept in that, in the neutron image detection method for collecting a fluorescent light generated by a neutron incident at a designated position interval in one-dimensional geometry and determining an incident position of the neutron by detecting the collected fluorescent light, wherein the fluorescent light is detected by photon counting method;

a pulse signal generated by an individual output photon is extracted on the basis of a clock signal generated with the same time interval as the time width of the pulse signal generated by a single photon;

a count-value distribution is obtained in terms of incident position as variable determined by a single neutron incident by counting the pulse signal output;

a neutron incident position is determined by calculating a median point on the basis of the obtained count-value distribution.

Another aspect of the neutron image detection method or the neutron image detector based on this method according to the present invention is based on the concept in that, in the neutron image detection method for collecting a fluorescent light generated by a neutron incident at a designated position interval on a vertical axis and a horizontal axis, respectively, in two-dimensional geometry and determining an incident position of the neutron by detecting the collected fluorescent light, wherein the fluorescent light is detected by photon counting method;

a pulse signal generated by an individual photon is extracted on the basis of a clock signal generated with the same time interval as the time width of the pulse signal generated by a single photon;

a count-value distribution is obtained on a vertical axis and a horizontal axis, respectively, in terms of incident position as variable determined by a single neutron incident by counting the pulse signal output;

a neutron incident position is determined on a vertical axis and a horizontal axis, respectively, by calculating a median point on a vertical axis and a horizontal axis, respectively, on the basis of the obtained count-value distribution.

Yet another aspect of the neutron image detection method or the neutron image detector based on this method according to the present invention is based on the concept in that, the neutron image detection method for collecting a fluorescent light from a scintillator generating a fluorescent light upon a neutron incident at a designated position interval on a vertical axis and a horizontal axis, respectively, in two-dimensional geometry and determining an incident position of the neutron by detecting the collected fluorescent light or detecting the fluorescent light directly in two-dimensional geometry wherein the fluorescent light is detected by photon counting method;

a pulse signal generated by an individual photon is extracted on the basis of a clock signal generated with the same time interval as the time width of the pulse signal generated by a single photon;

a two-dimensional count-value distribution is obtained in terms of incident position as variable determined by a single neutron incident by counting the pulse signal output, or obtained by detecting directly the fluorescent light;

a neutron incident position is determined on a vertical axis and a horizontal axis, respectively, on the basis of the obtained two-dimensional count-value distribution.

The above described position calculation can be performed in an extremely high speed by applying exactly FPGA (Field Programmable Gate Array) having a relatively large number of input pins, enabled by today's progressive integrated-circuit technologies. By applying the median point calculation, the incident position of neutron can be determined precisely.

As the neutron image detection method and detector according to the present invention include a sophisticated scheme for calculating the incident position of neutron, it will be appreciated that such a large number of expensive Analog/Digital Converters (ADC) as found in the prior art may not be used, but that the such scheme may be realized by a small-sized, inexpensive and dedicated hardware device. Thus, it will be appreciated that the neutron image detector according to the present invention may be significantly inexpensive, and also that the performance speed for creating the neutron image may be significantly fast.

BRIEF DESCRIPTION OF DRAWINGS

FIG. 13 is a graph showing an example of the improvement in the peak position resolution by the median point calculating circuit having a photon signal discriminating function in the two-dimensional neutron image detector in case of changing the number of photons.

DETAILED DESCRIPTION OF THE PREFERRED EMBODIMENTS

[Embodiment]
(Embodiment 1)

Figure 1:
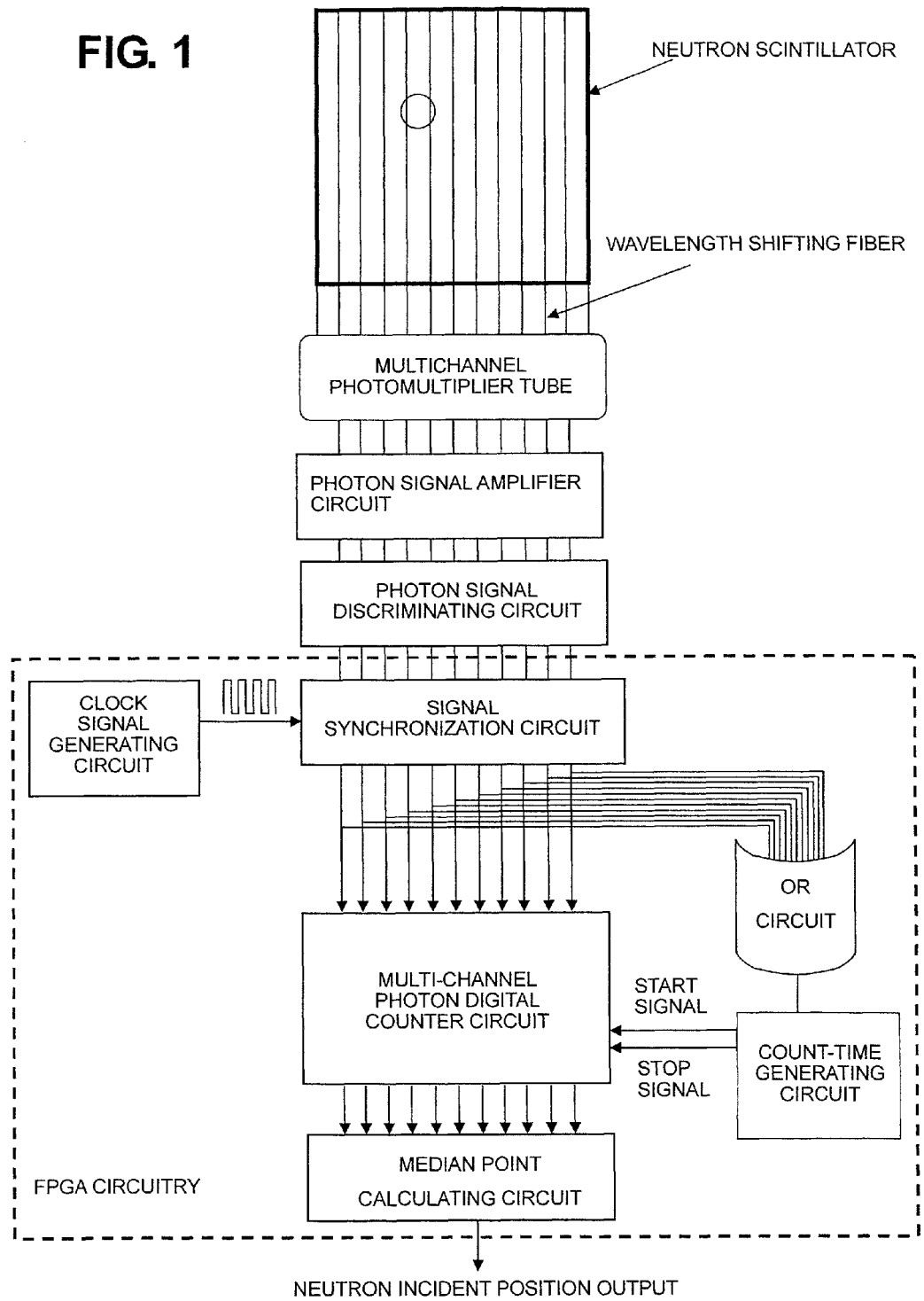
FIG. 1 is a schematic diagram showing the configuration of the median point calculating circuit in the one-dimensional neutron image detector.
Figure 2A:
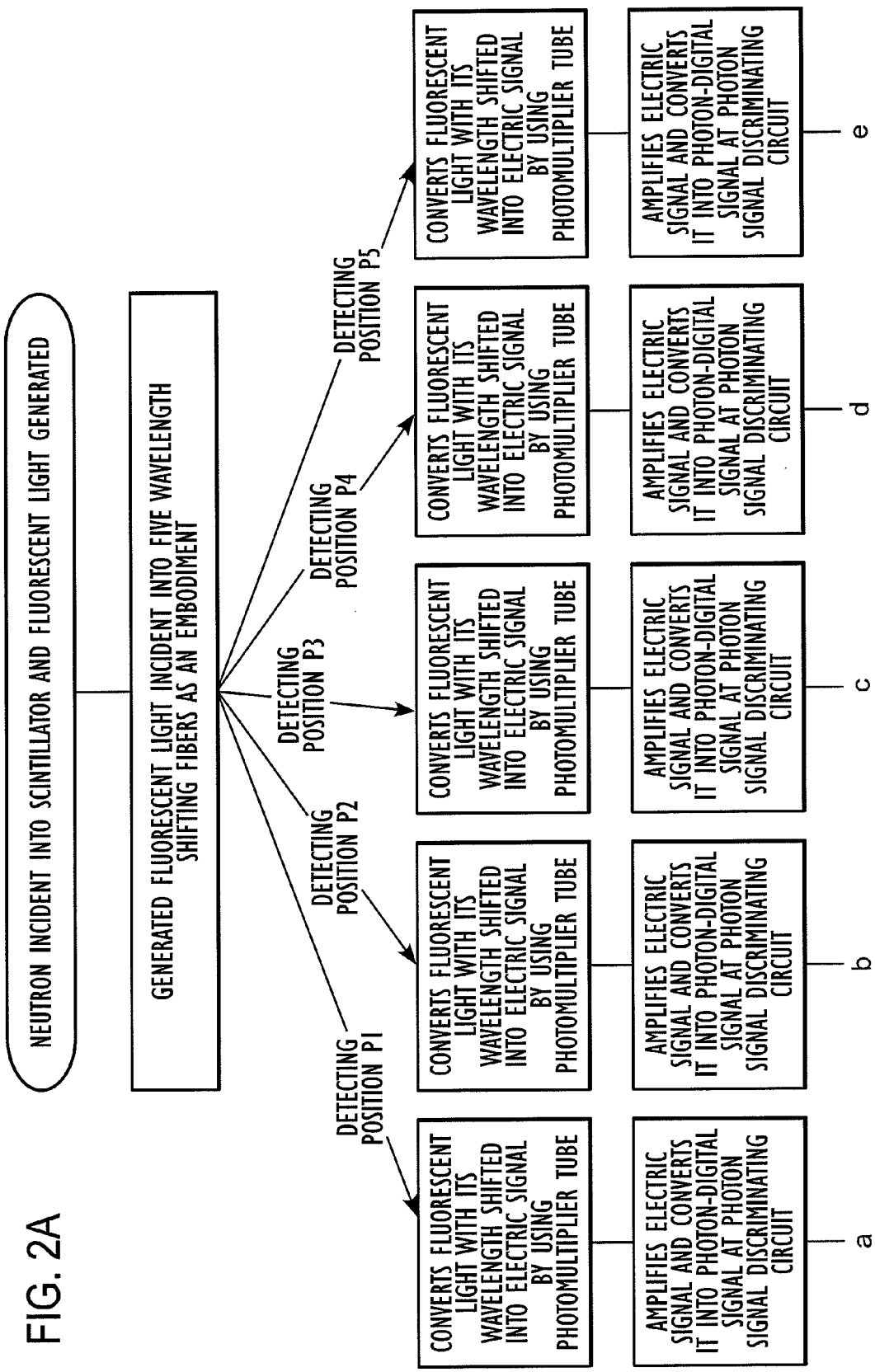
FIG. 2A is a first half of the flow chart of the median point calculation in the one-dimensional neutron image detector and FIG. 2B is a last half of the flow chart thereof.
Figure 2B:
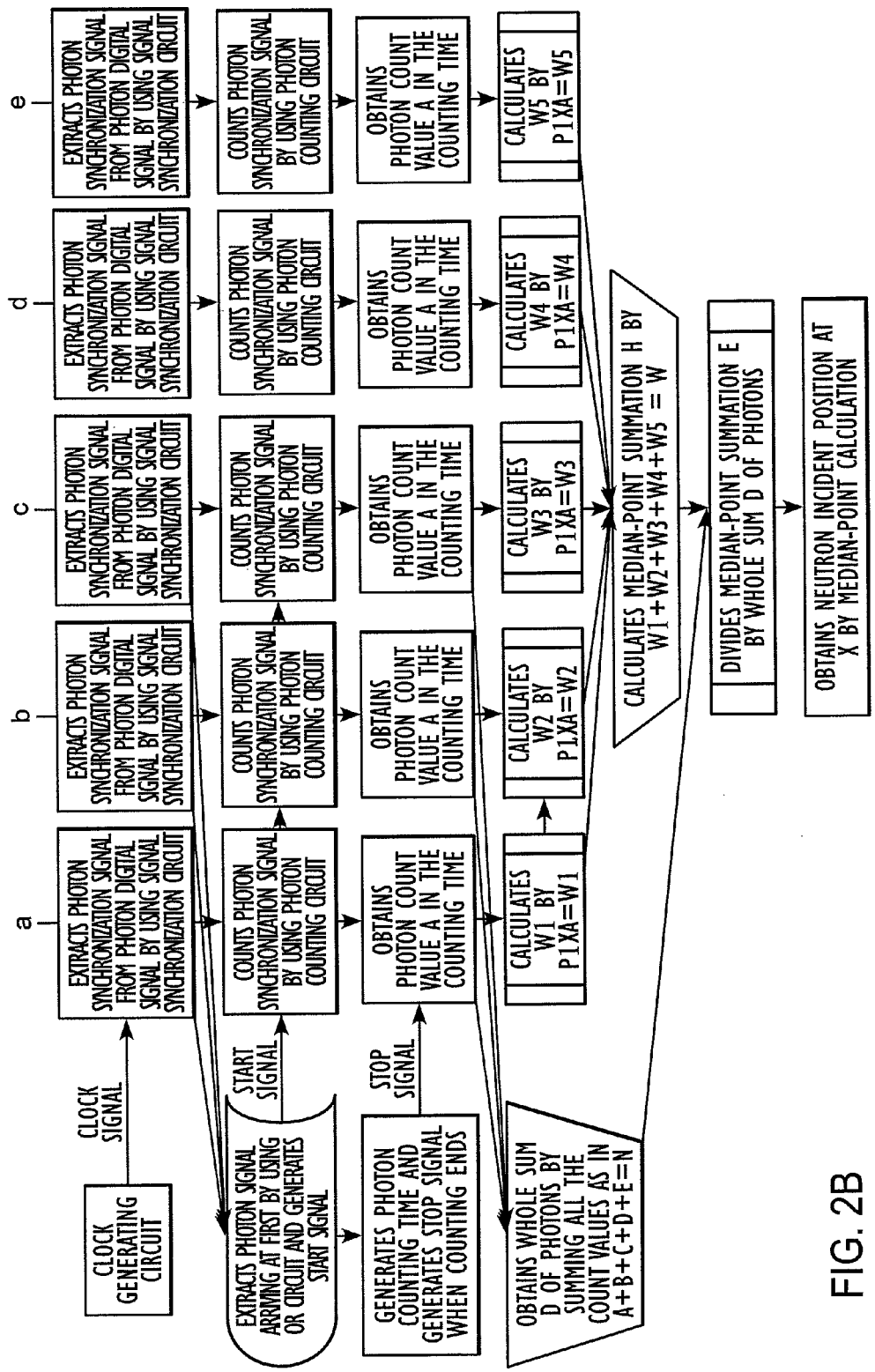

As Embodiment 1, FIG. 1 illustrates a schematic diagram showing the configuration of the median point calculating circuit in the one-dimensional neutron image detector using a scintillator and a wavelength shifting fiber. FIG. 2A and FIG. 2B show flow charts of the median point calculation in case that the generated fluorescent light incident into five wavelength shifting fibers upon the incidence of a neutron. In the flowcharts separated into A and B generally throughout the specification, A represents the first half of the whole flow chart and B represents the last half of the flow chart of the whole flow chart. Note that the end raw of blocks of the flow chart A are found as the first raw of blocks of the flow chart B in order to make it easier to understand the connectivity between the first half and the last half of the whole flow chart.

Figure 3:
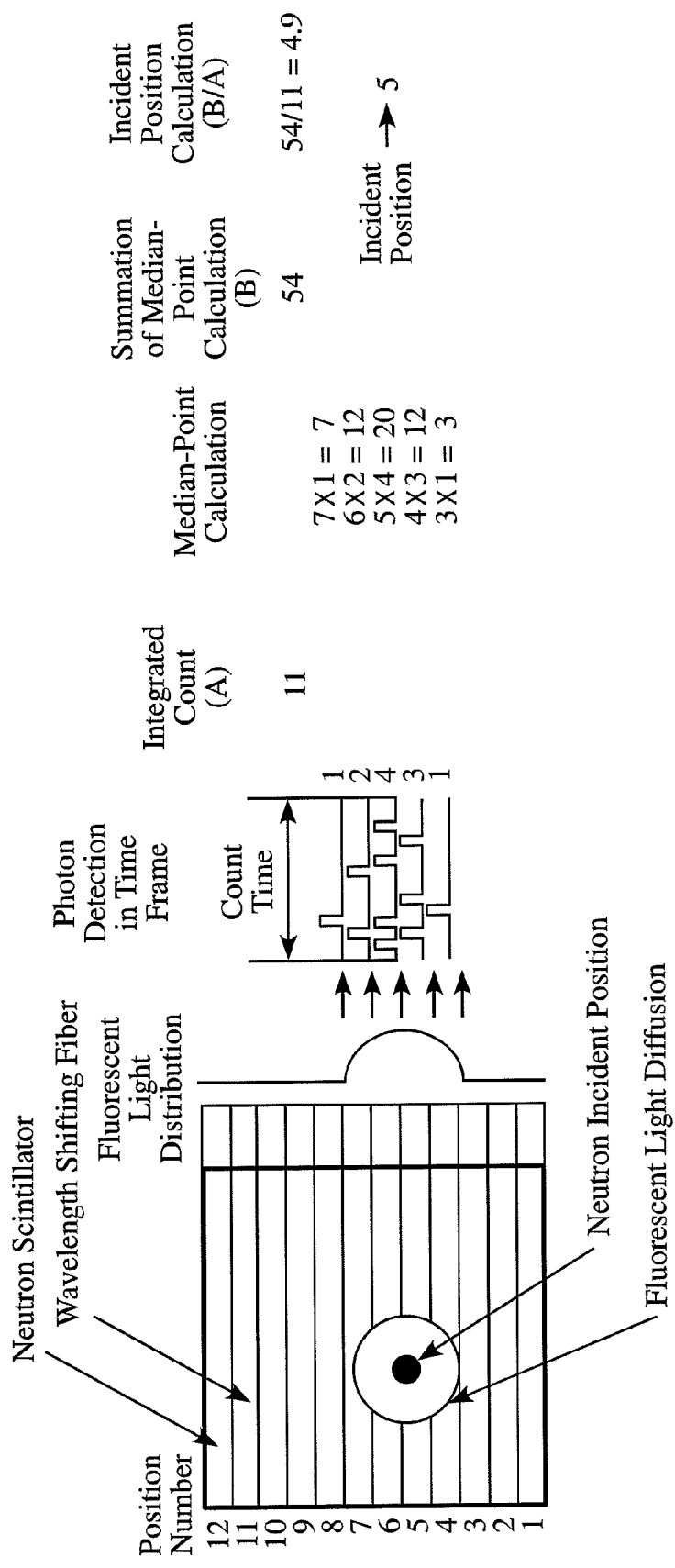
FIG. 3 is an illustrative diagram showing the calculation example of the median point calculation in the one-dimensional neutron image detector.

FIG. 3 illustrates an illustrative diagram showing the calculation example of the median point calculation based on the basic principle of the present invention. The one-dimensional neutron image detector using a scintillator and a wavelength shifting fiber in this embodiment has the structure shown below.

$ZnS:Ag/^{10}B_2O_3$ scintillator having a thickness of 0.3 mm is used as the neutron scintillator that emits the fluorescent light upon the incidence of a neutron. The wavelength of the fluorescent light emitted from ZnS:Ag-based fluorescent material has distributed from 390 nm to 520 nm, of which the center is 450 nm. The life-time of the short life-time component of the fluorescent light from ZnS:Ag-based fluorescent material to be used for detecting neutrons substantially is about 0.3 µs. BCF-92MC commercially available from Saint-Gobain K. K., that is sensitive to the fluorescent light having the wavelength from 350 nm to 440 nm and transforms the wavelength of the fluorescent light into 490 nm, is used as the wavelength shifting fiber. The shape of the wavelength shifting fiber is made in a right square having one side length of 0.5 mm. The one-dimensional neutron image detector having the effective sensing width of 32 mm is formed by arranging 64 wavelength shifting fibers in one-dimensional geometry, and by arranging $ZnS:Ag/^{10}B_2O_3$ scintillator above a bundle of those wavelength shifting fibers.

As for the optical detector for detecting the emitted fluorescent light experienced with wavelength shifting by the wavelength shifting fibers, H7546 commercially available from HAMAMATSU PHOTON ICS K.K. may be used, that is a 64-channel photomultiplier tube, each channel having an effective sensitive area of 2 mm×2 mm. The individual photon electric signals output from this photomultiplier tube are amplified by the photon signal amplifiers, each composed of a high-speed amplifier, and then the individual amplified signals are formed as the photon digital pulse signals by the photon signal discriminating circuit composed of individual discriminator circuits.

When detecting the fluorescent lights emitted from the wavelength shift fibers by using the 64-channel photomultiplier tube in the above configuration, the photon signal amplifier and the photon signal discriminating circuit having an ability to detect the fluorescent lights using the photon counting method are used. As for the photon signal amplifier, a couple of ICs, AD8001 commercially available from Analog Devices Inc. are used as high-speed ICs for the individual circuit and the overall amplifier is formed as an amplifier having a 60-times-amplifying gain with its amplifier bandwidth of 200 MHz. As for the photon signal discriminating circuit, AD8611 also commercially available from Analog Devices Inc. is used as the high-speed discriminator IC. Owing to applying the electronic circuit so configured as described above, the photon digital pulse signal having a pulse time width of about 5 ns can be obtained as a single signal per photon.

Next, the photon digital pulse signal generated by the photon output from the individual photomultiplier tube is extracted as the signal synchronized to the clock signal having a cycle time adapted to its pulse time width by using the signal synchronization circuit composed of the gate circuit, and then the synchronized photon signal is obtained. The frequency of the clock signal is made 100 MHz, generating the same pulse time width of 5 ns because the pulse time width of the photon pulse signal is 5 ns.

The logical "OR" operation is applied to the synchronized photon signals, each synchronized to one another, for all of 64 channels by "OR" circuit at first, and then, the timing when the pulse signal arrives at first to the input to "OR" circuit among the photon digital pulse signals obtained by detection and signal processing upon the incident of a neutron is defined to be the neutron incident time, and is made input to the count-time generating circuit. The count-time generating circuit supplies this first-arriving pulse signal as the start-time signal to the multi-channel photon digital counting circuit, which starts the counting operations at the individual channels.

The circuit for observing the predetermined count out time in the count-time generating circuit starts at the same time, and then this circuit generates a stop signal upon the predetermined count time reached and sends the stop signal to the multi-channel photon digital counting circuit, that terminates the counting operation and finally decides the counting values. In this embodiment, the count time is defined to be 1 μs corresponding to three times of 0.3 μs, which is the short life-time component of the fluorescent light from ZnS:Ag fluorescent material, so that almost all the short life-time component of the fluorescent light may be utilized. Thus, the photon count-value distribution at the center of the neutron incident position upon the single neutron incident into the scintillator is obtained in which the total amount of distributed photons is proportional to the amount of fluorescent light.

In the present invention, the incident position in one-dimensional geometry is determined by calculating a median point on the basis of the obtained photon count-value distribution. One embodiment of the median point calculation is described by referring to FIG. 3. In the calculation example below, assume that the fluorescent lights enter 5 (five) wavelength shifting fibers at the fiber positions 3 to 5. At first, the integrated count value A obtained by counting for the single neutron by using the wavelength shifting fibers is obtained by summing the count values at the positions 3 to 7, which makes 11 in this calculation example. Next, the median point count value summation B is obtained. This summed value is calculated by summing the values, each obtained individually by multiplying the position number value and the photon count value counted at the relevant position corresponding to its position number value. The median point count value summation makes 54 in this calculation example. The neutron incident position obtained in case of applying the median point calculating method is defined as a quotient obtained by dividing the median point count value summation B by the integrated count value A, that is, B/A=54/11=4.9. In case of representing the coordinate value of the incident position in terms of integer number, position 5 is obtained as the incident position by round-off calculation. In case of an increased accuracy in the incident position, a real value of 4.9 may be used as the coordinate value of the incident position.

Note that the weight values for the photon count values at the individual positions are uniformly made equal to 1 in the above calculation example, though it is allowed that the uneven weight values may be used in order to increase the position accuracy in case that the detection characteristics for the fluorescent light is not uniform.

(Embodiment 2)

Figure 4:
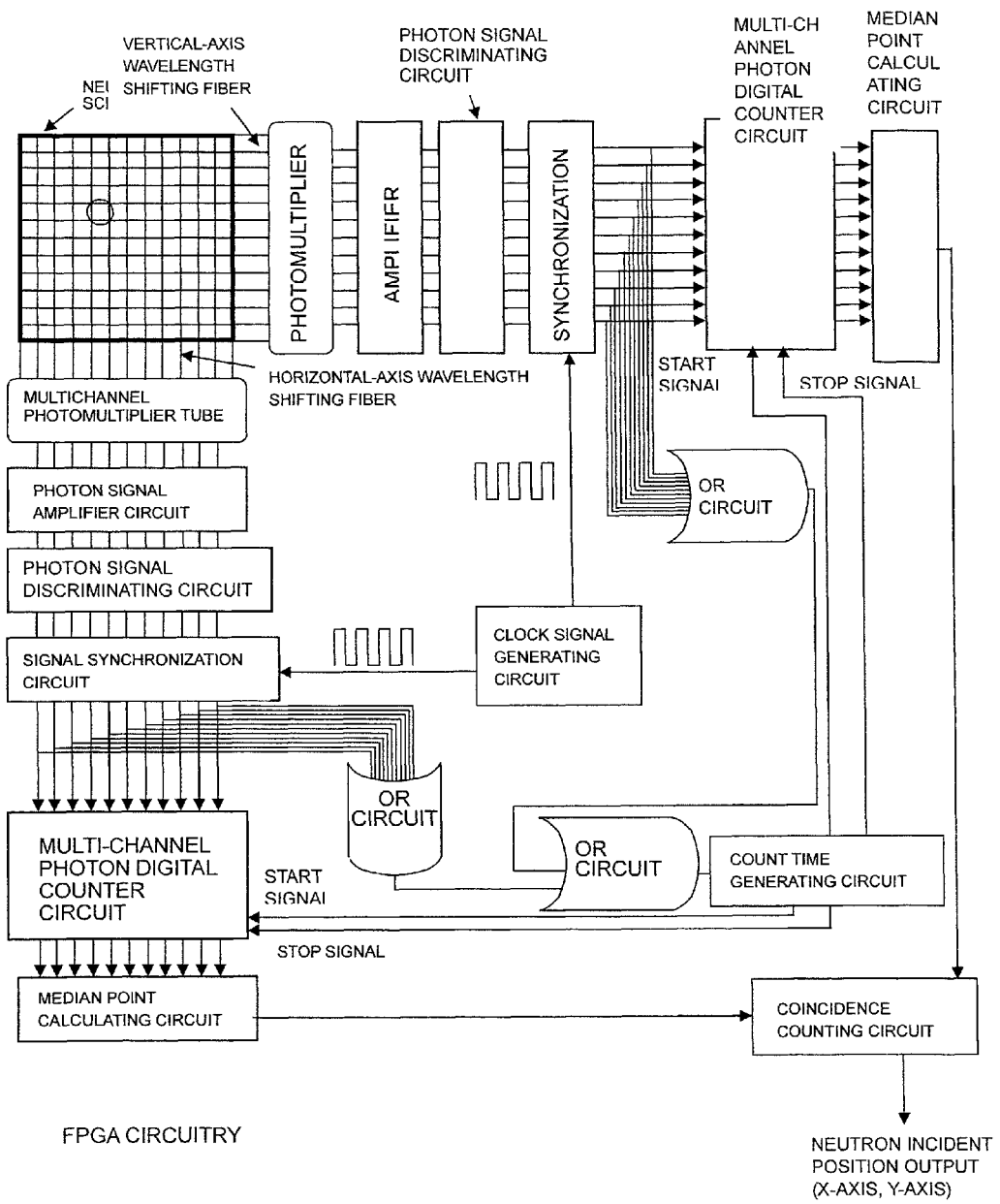
FIG. 4 is a schematic diagram showing the configuration of the median point calculating circuit in the two-dimensional neutron image detector.
Figure 5A:
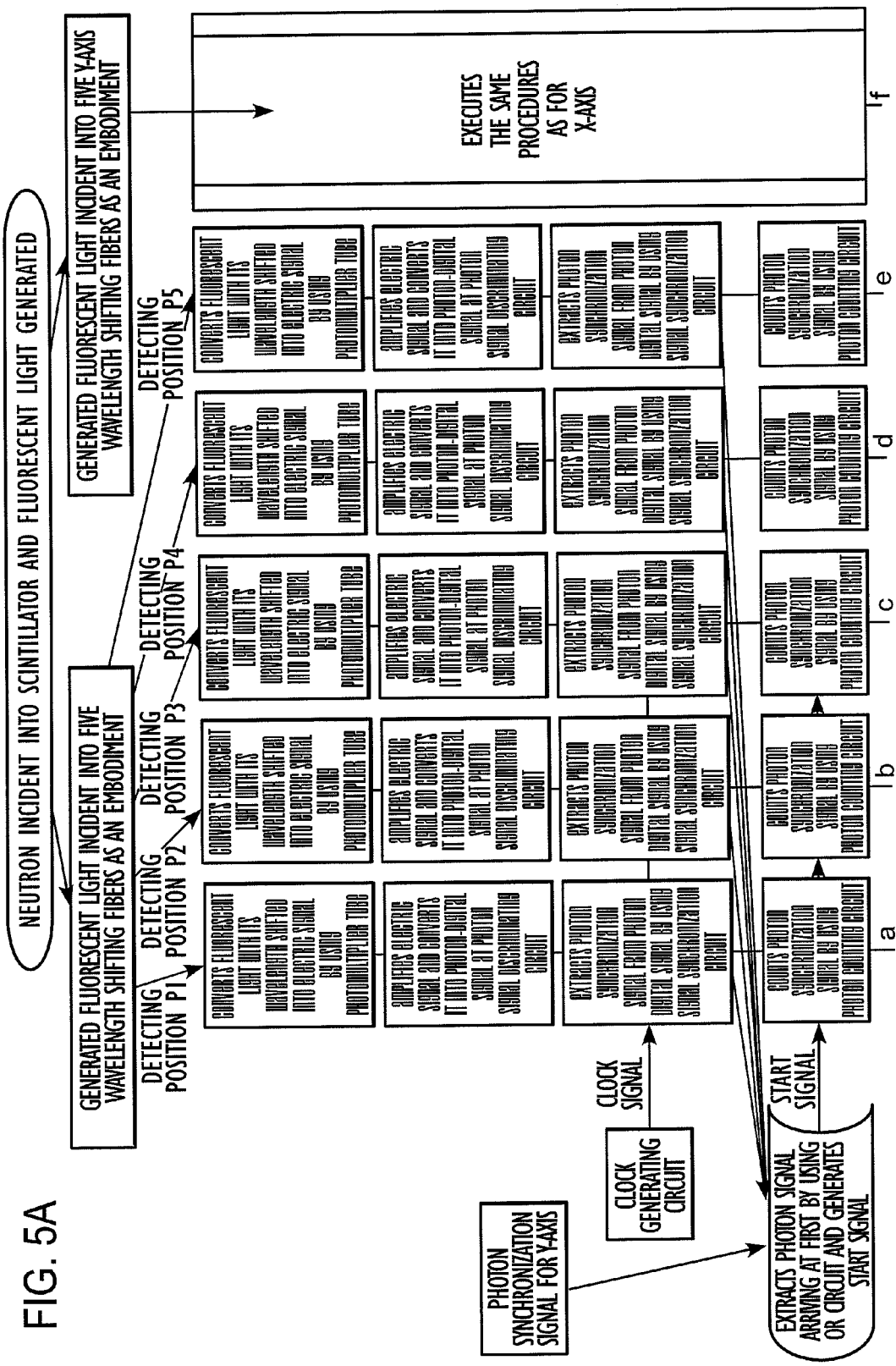
FIG. 5A is a first half of the flow chart of the median point calculation in the two-dimensional neutron image detector.
Figure 5B:
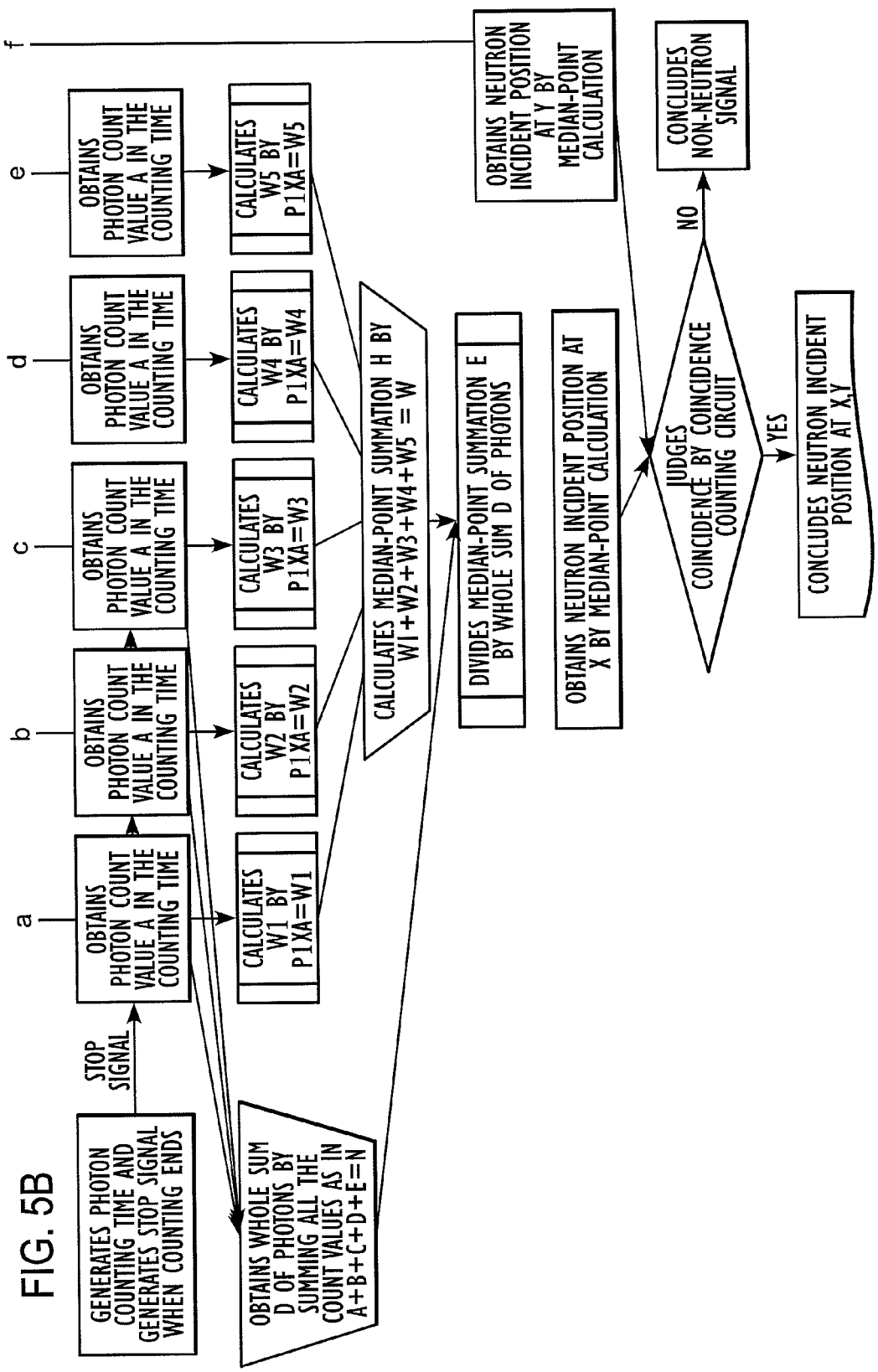
FIG. 5B is a last half of the flow chart thereof.

As Embodiment 2, FIG. 4 illustrates a schematic diagram showing the configuration of the median point calculating circuit in the two-dimensional neutron image detector using a scintillator and a wavelength shifting fiber. FIG. 5A and FIG. 5B show flow charts of the median point calculation in case that the generated fluorescent light incident into five wavelength shifting fibers for the vertical axis and the horizontal axis, respectively, upon the incidence of a neutron. The two-dimensional neutron image detector using a scintillator and a wavelength shifting fiber in this embodiment has the structure shown below.

ZnS:Ag/$^{10}$B$_2$O$_3$ scintillator having a thickness of 0.3 mm is used as the neutron scintillator that emits the fluorescent light upon the incidence of a neutron. The wavelength of the fluorescent light emitted from ZnS:Ag has distributed from 390 nm to 520 nm at the center of 450 nm. The life-time of the short life-time component of the fluorescent light from ZnS:Ag-based fluorescent material to be used for detecting neutrons substantially is about 0.3 μs. BCF-92MC commercially available from Saint-Gobain K. K., that is sensitive to the fluorescent light having the wavelength from 350 nm to 440 nm and transforms the wavelength of the fluorescent light into 490 nm, is used as the wavelength shirting fiber. The shape of the wavelength shifting fiber is made in a right square having one side length of 0.5 mm.

A bundle of wavelength shifting fibers for fetching count values along the vertical axis is formed by arranging 64 wavelength shifting fibers in one-dimensional geometry. A bundle of wavelength shifting fibers for fetching count values along the horizontal axis is formed by arranging 64 wavelength shifting fibers in one-dimensional geometry on the bundle of wavelength shifting fibers for fetching count values along the vertical axis in one-dimensional geometry in the diagonal direction. ZnS:Ag/$^{10}$B$_2$O$_3$ scintillator is formed above the bundle of those wavelength shifting fibers. Owing to this structure, a two-dimensional neutron detector having the dimension of the effective sensitive area of 32 mm in height and 32 mm in width may be formed. As for the optical detector for detecting the emitted fluorescent light experienced with wavelength shift by the wavelength shifting fibers, H7546 commercially available from HAMAMATSU PHOTONICS K.K. may be used, that is a 64-channel photomultiplier tube for the horizontal axis and the vertical axis, respectively, each channel having an effective sensitive area of 2 mm×2 mm. The individual photon electric signals output from the photomultiplier tubes for the horizontal axis and the vertical axis, respectively, are amplified by the photon signal amplifiers, each composed of a high-speed amplifier for the horizontal axis and the vertical axis, respectively, and then the individual amplified signals are formed as the photon digital pulse signals for the horizontal axis and the vertical axis, respectively, by the photon signal discriminating circuit composed of individual discriminator circuits.

When detecting the fluorescent lights emitted from the wavelength shift fibers by using the 64-channel photomultiplier tube in the above configuration, the photon signal amplifier and the photon signal discriminating circuit having an ability to detect the fluorescent lights using the photon counting method are used. As for the photon signal amplifier, a couple of ICs, AD8001 commercially available from Analog Devices Inc. are used as high-speed ICs for the individual circuit and the overall amplifier is formed as an amplifier having a 60-times-amplifying gain with its amplifier bandwidth of 200 MHz. As for the photon signal discriminating circuit, AD8611 also commercially available from Analog Devices Inc. is used as the high-speed discriminator IC. Owing to applying the electronic circuit so configured as described above, the photon digital pulse signal having a pulse time width of about 5 ns can be obtained as a single signal per photon.

Next, the photon digital pulse signal generated by the photon output from the individual photomultiplier tube is extracted as the signal synchronized to the clock signal having a cycle time adapted to its pulse time width by using the signal synchronization circuit composed of the gate circuit, and then the synchronized photon signal is obtained. The frequency of the clock signal is made 100 MHz, generating the same pulse time width of 5 ns because the pulse time width of the photon pulse signal is 5 ns.

The arithmetic "OR" operation is applied to the synchronized photon signals output for the vertical axis and the horizontal axis, respectively, each synchronized to one another, for all of 64 channels by "OR" circuit at first, and then, the timing when the pulse signal arrives at first to the input to "OR" circuit among the photon digital pulse signals obtained by detection and signal processing upon the incident of a neutron is defined to be the neutron incident time, and is made input to the count-time generating circuit. The count-time generating circuit supplies this first-arriving pulse signal as the start-time signal to the multi-channel photon digital counting circuit for the vertical axis and the horizontal axis, respectively, which start the counting operations at the individual channels. The circuit for observing the predetermined count out time in the count-time generating circuit starts at the same time, and then this circuit generates a stop signal upon the predetermined count time reached and sends the stop signal to the multi-channel photon digital counting circuits for the vertical axis and the horizontal axis, respectively, that terminate the counting operation and finally decides the counting values for the vertical axis and the horizontal axis, respectively. In this embodiment, the count time is defined to be 1 μs corresponding to three times of 0.3 μs, that is the short life-time component of the fluorescent light from ZnS:Ag fluorescent material, so that almost all the short life-time component of the fluorescent light may be utilized. Thus, the photon count-value distribution at the center of the neutron incident position upon the single neutron incident into the scintillator is obtained in which the total amount of distributed photons is proportional to the amount of fluorescent light.

In the present invention, the incident position in two-dimensional geometry is determined by calculating a median point on the basis of the obtained photon count-value distribution. In one embodiment of the median point calculation, the neutron incident position in two-dimensional geometry on the vertical axis and the horizontal axis, respectively, is obtained individually by using the same method as described by referring to FIG. 3 in Embodiment 1. The position signals for the vertical axis and the horizontal axis, each obtained independently, are supplied to the coincidence counting circuit that judges whether the position signal for the vertical axis and the position signal for the horizontal axis establish coincidence by observing that those signals arrive during a predetermined time window. If their coincidence is proved to be valid, the neutron incident position signal is made output as the neutron signal, and if proved to be invalid, the neutron incident position signal is not made output. The coincidence count time (coincidence time) is defined to be 1 μs corresponding to three times of 0.3 μs, which is the short life-time component of the fluorescent light from ZnS:Ag fluorescent material.

Note also in the description of this embodiment that the weight values for the photon count values at the individual positions are uniformly made equal to 1 in the above calculation example, though it is allowed that the uneven weight values may be used in order to increase the position accuracy in case that the detection characteristics for the fluorescent light is not uniform.

Figure 6:
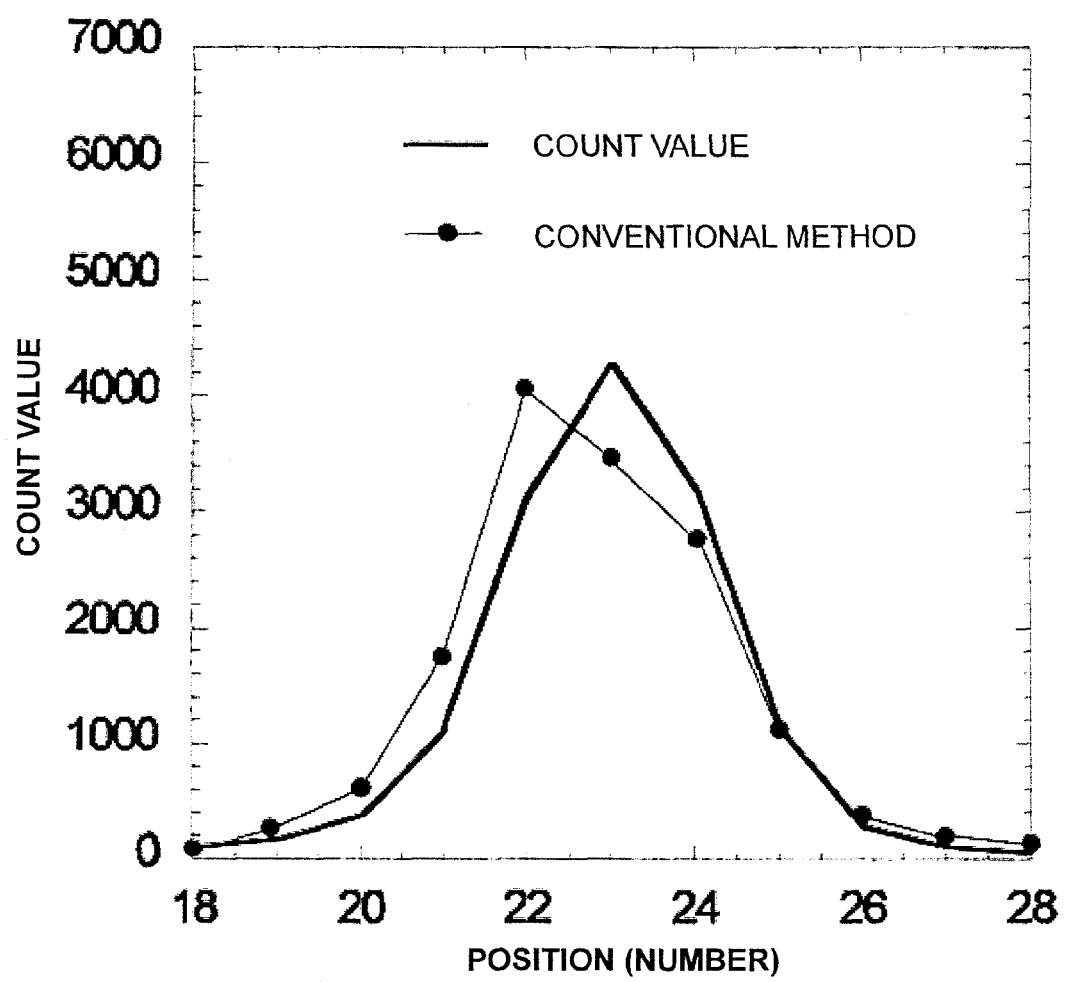
FIG. 6 is a graph showing an example of the peak analysis result of the median point calculation in the two-dimensional neutron image detector.

In order to estimate the characteristics in determining the neutron incident position of the two-dimensional neutron image detector in this embodiment, neutron irradiation experiment was conducted by using cold neutrons having a wavelength of 4 A° at CHOP, Pulsed Neutron Instrument with Disk Chopper, at JRR-3 Research Reactor, Japan Atomic Energy Agency. A Cd (Cadmium)-based collimator plate having a hole having a diameter of 1.1 mm is placed in front of the neutron image detector of this embodiment, and the collimated neutron beam having a diameter of 1.1 mm is made irradiated. FIG. 6 shows the comparison between the result obtained by applying the median point calculating method according to the present invention to the photon count distribution obtained by the neutron beam and the result obtained by applying the pattern matching method in the prior art to the same photon count distribution obtained as above. This figure is the result of viewing the two-dimensional incident position distribution in the horizontal-axis direction.

Figure 7:
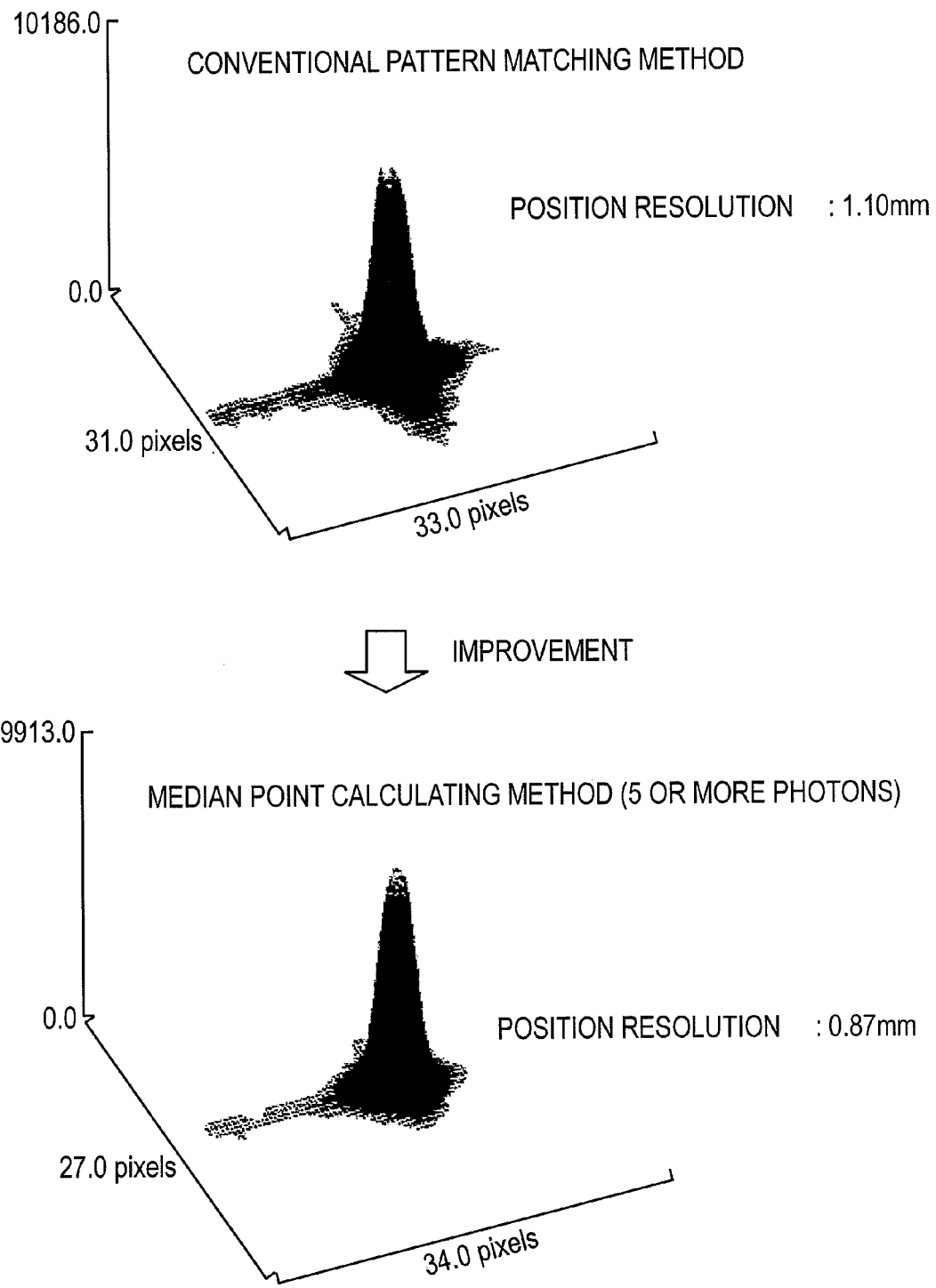
FIG. 7 is a three-dimensional representation of the peak analysis result of the median point calculation in the two-dimensional neutron image detector.

The position resolution calculated by the pattern matching method in the prior art is 1.08 mm while the position resolution calculated by the median point calculating method according to the present invention is 0.92 mm, which proves that the position resolution can be improved by 0.16 mm. In the prior art method, the peak profile on the count-value distribution is observed to be shifted asymmetrically to the left side and the peak position is also shifted by the displacement corresponding to the gap between the adjacent wavelength shifting fibers, though the peak profile in the method according to the present invention is observed to be proximate to symmetrical Gaussian distribution, and its peak position is also observed to be located at the center of the distribution. FIG. 7 shows the three-dimensional image of the neutron peak obtained by the prior art method and the three-dimensional image of the neutron peak obtained by the median point calculating method according to the present invention. As described above, it is proved that the peak profile is improved and that the count-value distribution is symmetrical in the omni-directions in three-dimensional geometry in the method according to the present invention.

(Embodiment 3)

Figure 8:
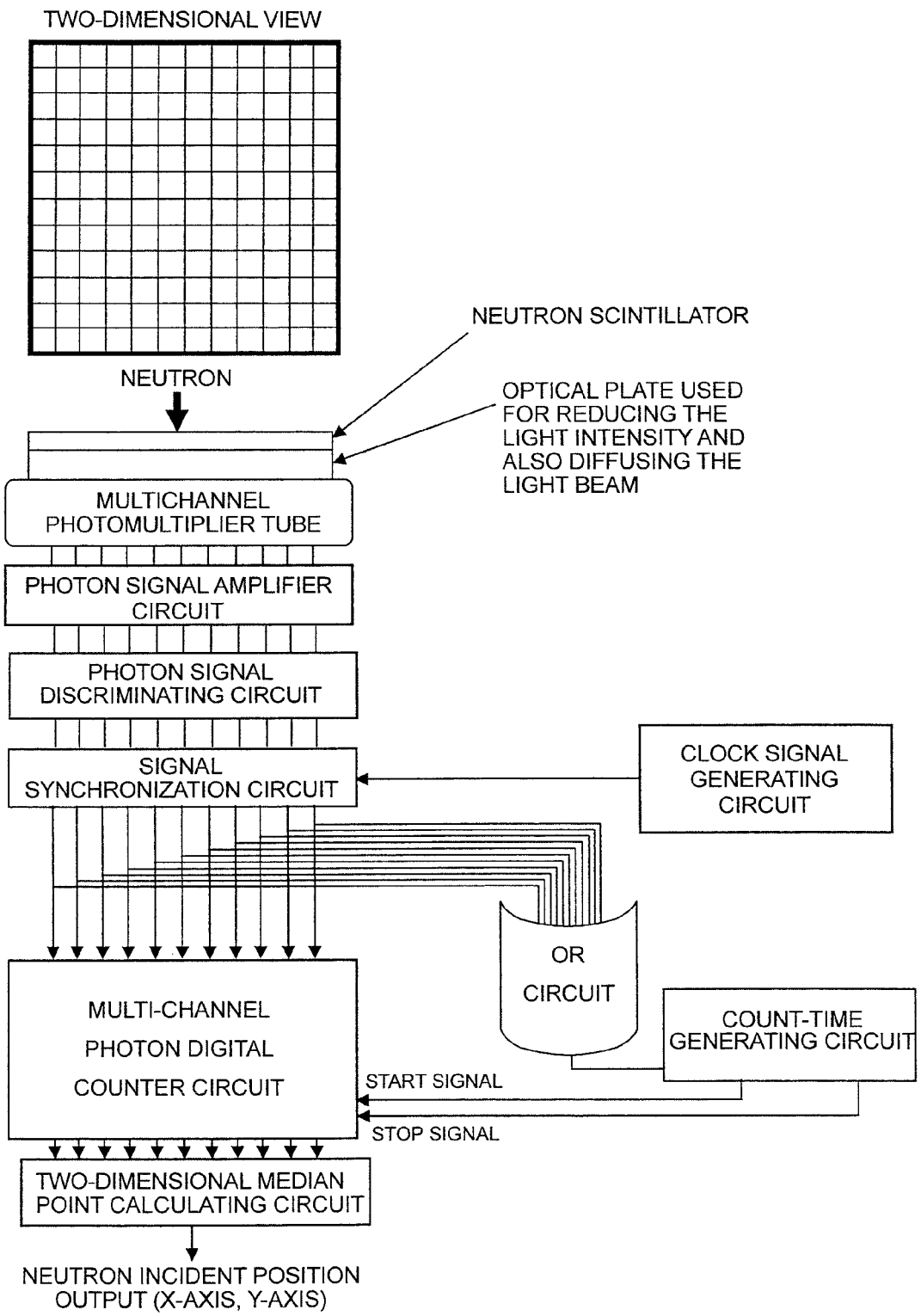
FIG. 8 is a schematic diagram showing the configuration of the median point calculating circuit in the two-dimensional neutron image detector using two-dimensional processing method.
Figure 9A:
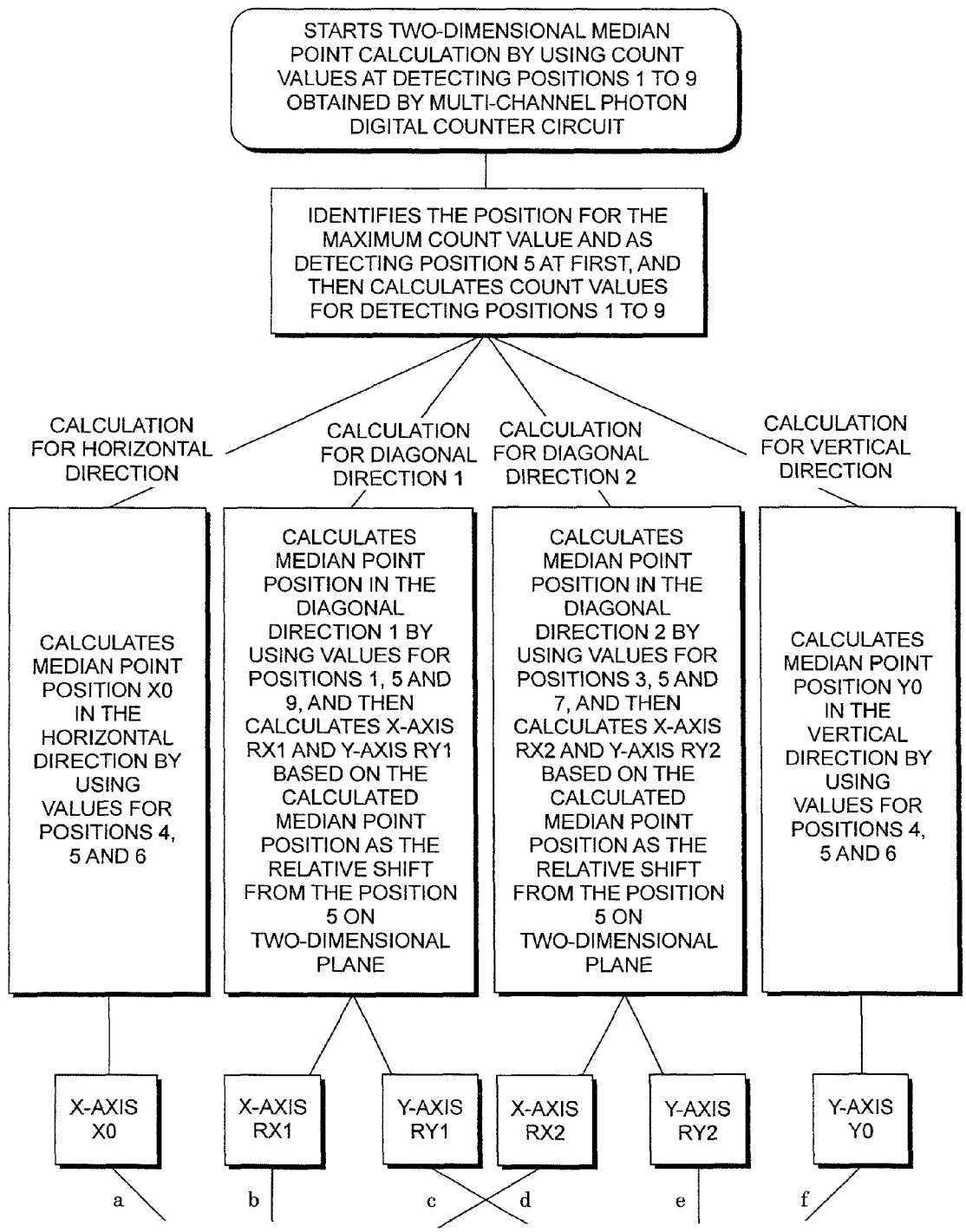
FIG. 9A is a first half of the flow chart of the median point calculation in the two-dimensional neutron image detector using two-dimensional processing method.
Figure 9B:
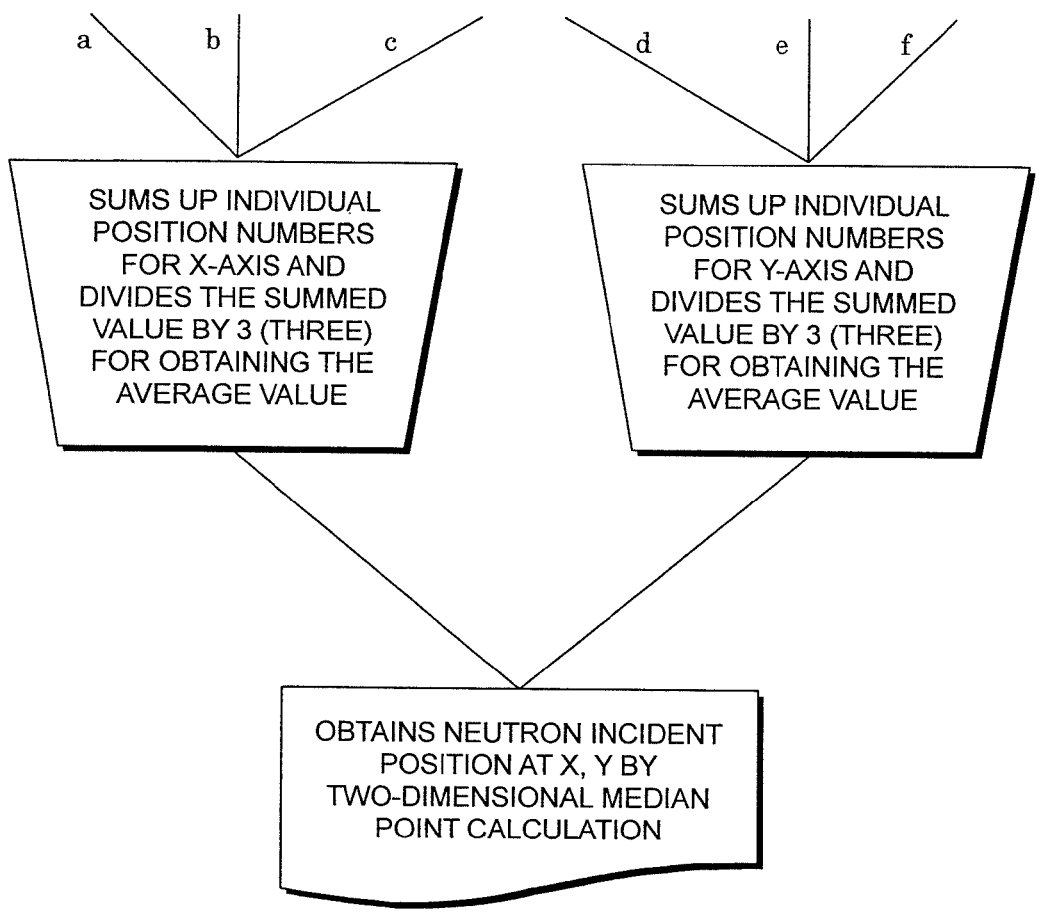
FIG. 9B is a last half of the flow chart thereof.

As Embodiment 3, FIG. 8 illustrates a schematic diagram showing the configuration of the median point calculating circuit in the two-dimensional neutron image detector for determining the incident position of the neutron by detecting the fluorescent light from the scintillator directly in two-dimensional geometry. Each of FIG. 9A and FIG. 9B illustrates a flow chart of the median point calculation based on the basic principle of the median point calculation in two-dimensional geometry according to the present invention. The two-dimensional neutron image detector using a scintillator in this embodiment has the structure shown below.

ZnS:Ag/$^{10}B_2O_3$ scintillator having a thickness of 0.3 mm is used as the neutron scintillator that emits the fluorescent light upon the incidence of a neutron. The wavelength of the fluorescent light emitted from ZnS:Ag has distributed from 390 nm to 520 nm at the center of 450 nm. The life-time of the short life-time component of the fluorescent light from ZnS:Ag-based fluorescent material to be used for detecting neutrons substantially is about 0.3 μs.

As the signal processing is applied to the photon count values in the present invention, in case of detecting the photons by using the photomultiplier tube that is a photoelectric detector sensitive to the light from the scintillator, the photomultiplier measures a bunch of photons, which makes it difficult to obtain the designated accuracy in the photon count-value distribution, which will be described in detail in Embodiment 5. In order to solve this problem, an optical plate used for attenuating the light intensity and also diffusing the light beam is provided in front of the photomultiplier tube. As the light-intensity attenuation rate for the wavelength shifting fiber having a high detection efficiency as described in Embodiments 1 and 2 is 4%, the light-intensity attenuation rate in this embodiment is made 1/25 so as to be the same level of light-intensity attenuation rate. Though this embodiment uses the fluorescent light emitted from the scintillator and attenuated by the optical plate used for attenuating the light intensity and also diffusing the light beam, it is allowed to using an optical guide method in which the fluorescent light may be attenuated by a few ten percents and detected by the photomultiplier tube.

As for the photomultiplier tube to be used, H7546 commercially available from HAMAMATSU PHOTONICS K.K. may be used, that is a 64-channel photomultiplier tube, each channel having an effective sensitive area of 2 mm×2 mm.

As the size of the overall effective sensitive area of the 64-channel photomultiplier tube is 18.1 mm×18.1 mm, the size of the neutron scintillator and the light-intensity attenuation filter is made to be 20 mm×20 mm.

When detecting the fluorescent lights by using the 64-channel photomultiplier tube, the photon signal amplifier and the photon signal discriminating circuit having an ability to detect the fluorescent lights using the photon counting method are used. As for the photon signal amplifier, a couple of ICs, AD8001 commercially available from Analog Devices Inc. are used as high-speed ICs for the individual circuit and the overall amplifier is formed as an amplifier having a 60-times-amplifying gain with its amplifier bandwidth of 200 MHz. As for the photon signal discriminating circuit, AD8611 also commercially available from Analog Devices Inc. is used as the high-speed discriminator IC. Owing to applying the electronic circuit so configured as described above, the photon digital pulse signal having a pulse time width of about 5 ns can be obtained as a single signal per photon.

Next, the photon digital pulse signal generated by the photon output from the individual photomultiplier tube is extracted as the signal synchronized to the clock signal having a cycle time adapted to its pulse time width by using the signal synchronization circuit composed of the gate circuit, and then the synchronized photon signal is obtained. The frequency of the clock signal is made 100 MHz, generating the same pulse time width of 5 ns because the pulse time width of the photon pulse signal is 5 ns.

The arithmetic "OR" operation is applied to the synchronized photon signals output, each synchronized to one another, for all of 64 channels by "OR" circuit at first, and then, the timing when the pulse signal arrives at first to the input to "OR" circuit among the photon digital pulse signals obtained by detection and signal processing upon the incident of a neutron is defined to be the neutron incident time, and is made input to the count-time generating circuit. The count-time generating circuit supplies this first-arriving pulse signal as the start-time signal to the multi-channel photon digital counting circuit, which starts the counting operations at the individual channels. The circuit for observing the predetermined count out time in the count-time generating circuit starts at the same time, and then this circuit generates a stop signal upon the predetermined count time reached and sends the stop signal to the multi-channel photon digital counting circuit, that terminates the counting operation and finally decides the counting values. In this embodiment, the count time is defined to be 1μs corresponding to three times of 0.3 μs, that is the short life-time component of the fluorescent light from ZnS:Ag fluorescent material, so that almost all the short life-time component of the fluorescent light may be utilized.

Thus, the photon count-value distribution at the center of the neutron incident position upon the single neutron incident into the scintillator can be obtained in which the total amount of distributed photons is proportional to the amount of fluorescent light, as shown in "Two-dimensional View" illustrated in two-dimensional geometry at the most upper part of FIG. 8

In the present invention, the incident position in one-dimensional geometry is determined by calculating a median point on the basis of the obtained photon count-value distribution. One embodiment of the median point calculation is described by referring to the flow chart of the median point calculation using two-dimensional processing method shown in FIG. 9A and FIG. 9B. In this calculation example, the position having the maximum count value is obtained at first. In the calculation example below, assume that the position having the maximum count value is position 5 (five). Next, the median point calculation is executed for the distinctive 4 (four) directions originated at the position 5 as the center, i.e. horizontal direction, diagonal direction 1, diagonal direction 2 and vertical direction.

For the diagonal direction 1 and the diagonal direction 2, their diagonal components are made separated into the horizontal-axis component and the vertical-axis component, each contributing scalar components to form the diagonal component. Using the obtained components, their own average values for the individual vertical-axis and horizontal-axis components are calculated as the incident position on the horizontal axis and the incident position on the vertical axis, respectively, and then made output as the neutron incident position.

Note that the weight values for the photon count values at the individual positions are uniformly made equal to 1 in the above calculation example, though it is allowed that the uneven weight values may be used in order to increase the position accuracy in case that the detection characteristics for the fluorescent light is not uniform.

(Embodiment 4)

Figure 10A:
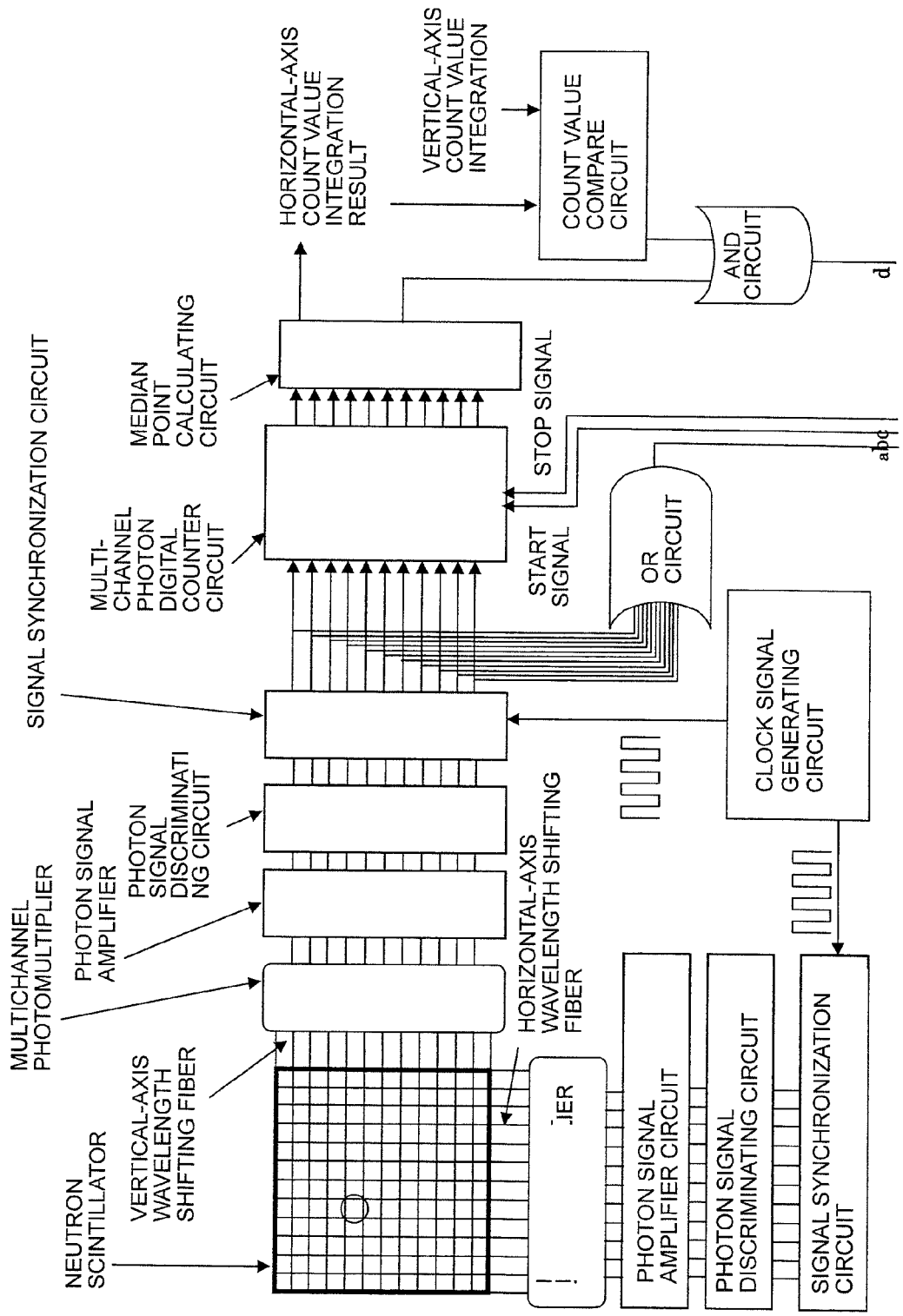
FIG. 10A is a first half of schematic diagram showing the configuration of the median point calculating circuit having a photon signal discriminating function in the two-dimensional neutron image detector.
Figure 10B:
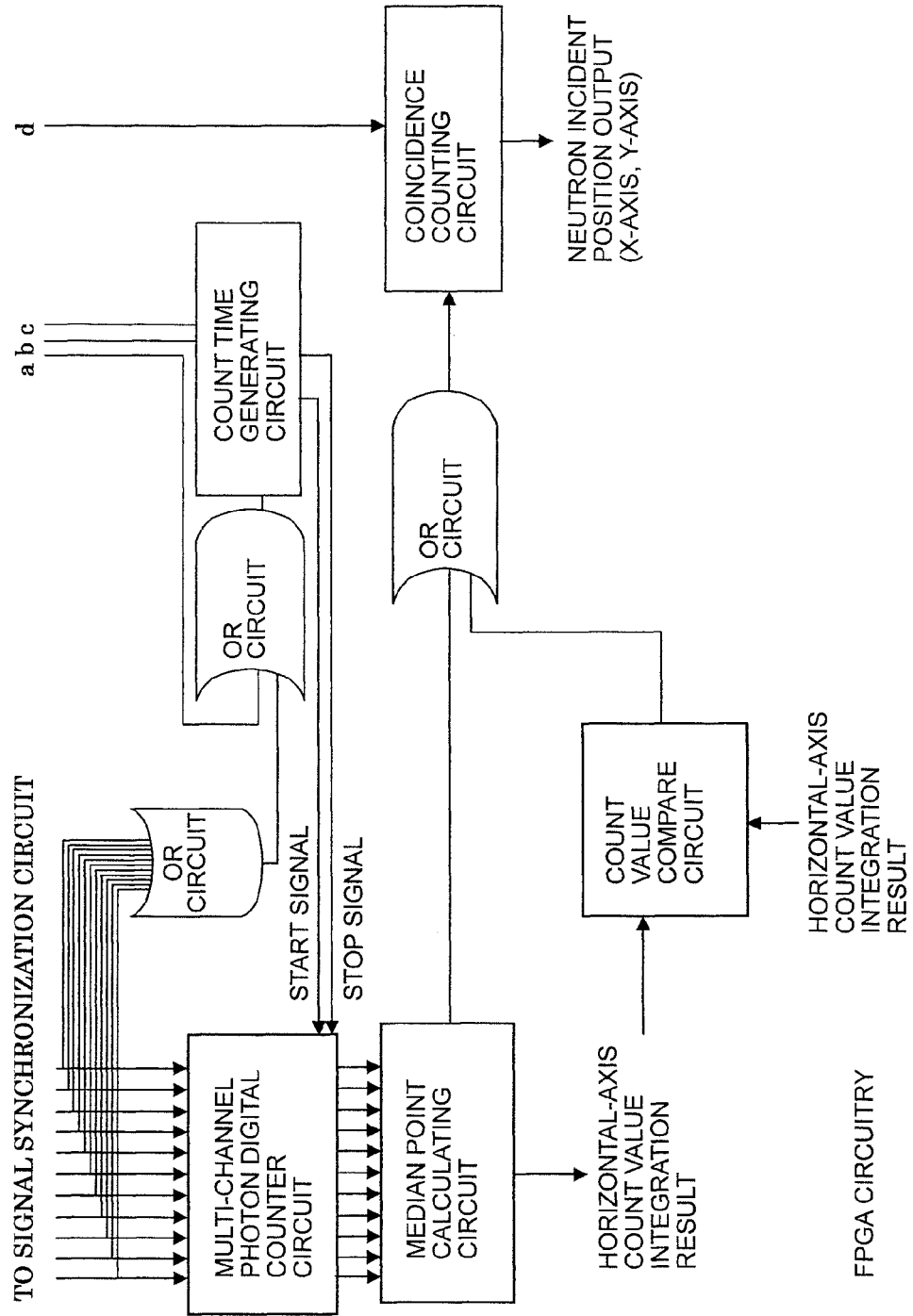
FIG. 10B is a last half of the schematic diagram thereof.
Figure 11A:
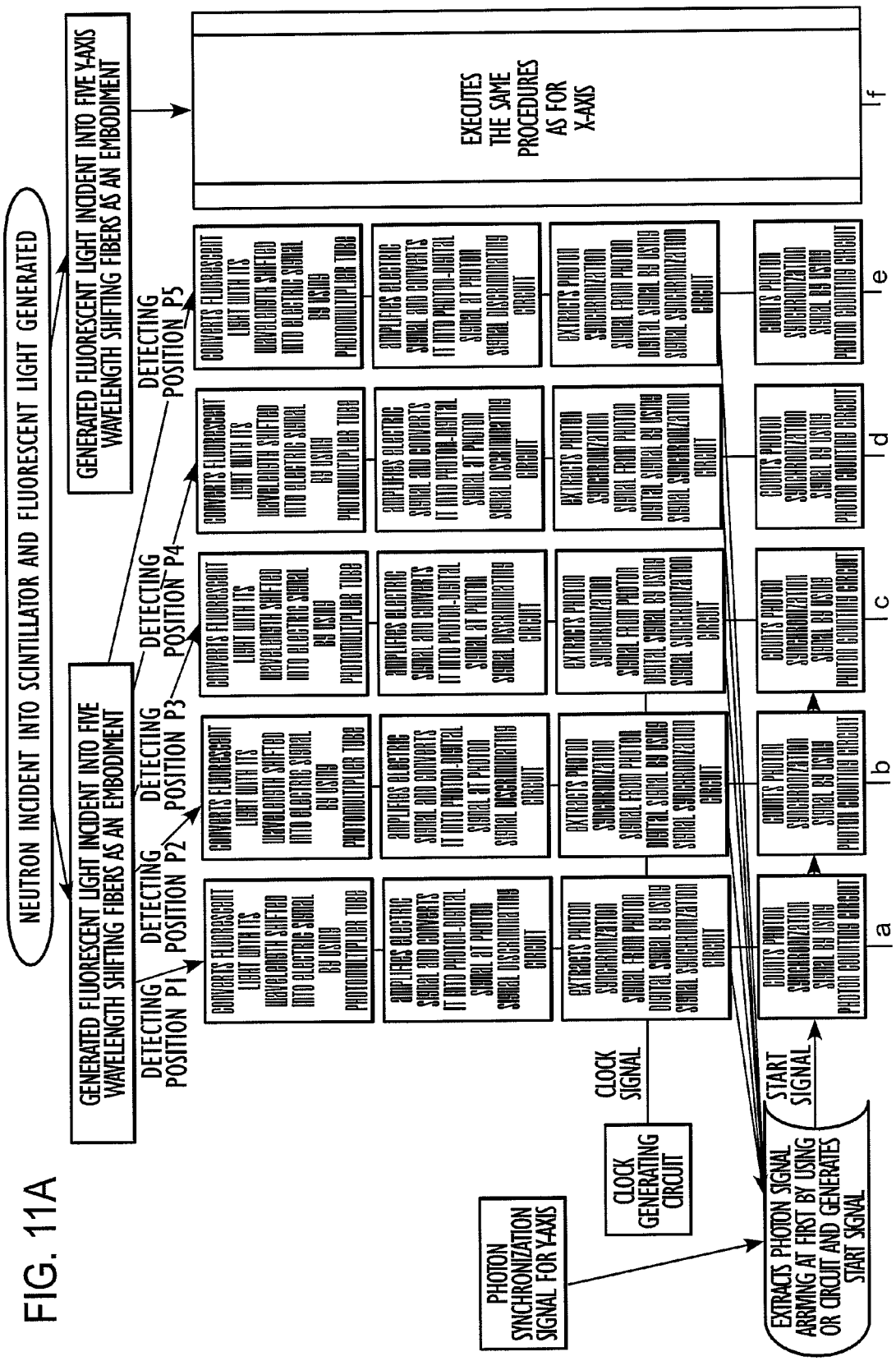
FIG. 11A is a first half of the flow chart of the median point calculation having a photon signal discriminating function in the two-dimensional neutron image detector.
Figure 11B:
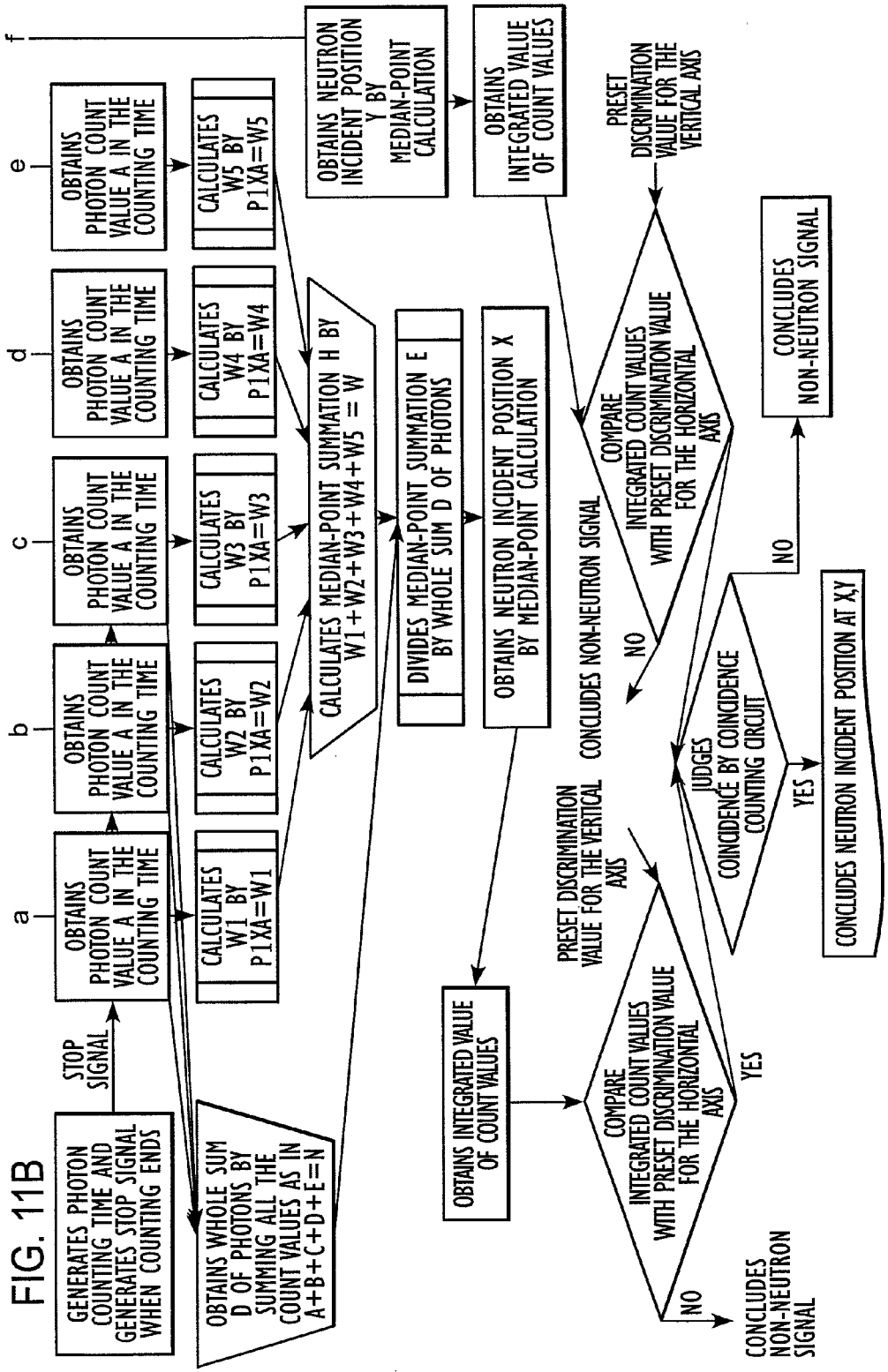
FIG. 11B is a last half of the flow chart thereof.

As Embodiment 4, FIG. 10A and FIG. 10B illustrate schematic diagrams showing the configuration of the median point calculating circuit in the two-dimensional neutron image detector using a scintillator and a wavelength shifting fiber according to the present invention. FIG. 11A and FIG. 11B show flow charts of the median point calculation in case that the generated fluorescent light incident into five wavelength shifting fibers for the vertical axis and the horizontal axis, respectively, upon the incidence of a neutron.

The two-dimensional neutron image detector using a scintillator and a wavelength shifting fiber in this embodiment has the same structure as Embodiment 2. Note that the additional function including the median-point calculating circuit and its down stream in the present invention will be now described.

At first, the neutron incident position in two-dimensional geometry on the vertical axis and the horizontal axis, respectively, is determined individually by the median point calculation on the basis of the photon count-value distribution obtained by using the same method as Embodiment 2. The integrated value for the horizontal-axis count values and the an integrated value for the horizontal-axis count values, both obtained at median point calculation, are extracted for the signals to be used for discrimination, respectively. Next, comparing the integrated value for the horizontal-axis count values with the preset discrimination value for the horizontal axis, if the integrated value for the horizontal-axis count values is equal to or larger than the preset discrimination value for the horizontal axis, in which the output of AND circuit is turned "ON", then the incident position on the horizontal axis is made transmitted to the coincidence counting circuit. Similarly, comparing the integrated value for the vertical-axis count values with the preset discrimination value for the vertical axis, if the integrated value for the vertical-axis count values is equal to or larger than the preset discrimination value for the vertical axis, in which the output of AND circuit is turned "ON", then the incident position on the vertical axis is made transmitted to the coincidence counting circuit. The position signals for the vertical axis and the horizontal axis, each transmitted as described above, are supplied to the coincidence counting circuit that judges whether the position signal for the vertical axis and the position signal for the horizontal axis establish coincidence by observing that those signals arrive during a predetermined time window. If their coincidence is proved to be valid, the neutron incident position signal is made output as the neutron signal, and if proved to be invalid, the neutron incident position signal is not made output. The coincidence count time (coincidence time) is defined to be 1 μs corresponding to three times of 0.3 μs, that is the life time of the short life-time component of the fluorescent light from ZnS:Ag fluorescent material.

In this embodiment, the present values for the position signals for the vertical axis and the horizontal axis, respectively, are determined and then, the position signals are judged individually to be valid if the individual position signals are equal to or larger than the individual preset values. However, it is allowed that a single present discrimination value for the photon count value is used to be compared with the sum of the integrated value for the horizontal-axis count values and the integrated value for the vertical-axis count values in order to validate the position signal for the horizontal axis and the position signal for the vertical axis.

Figure 12:
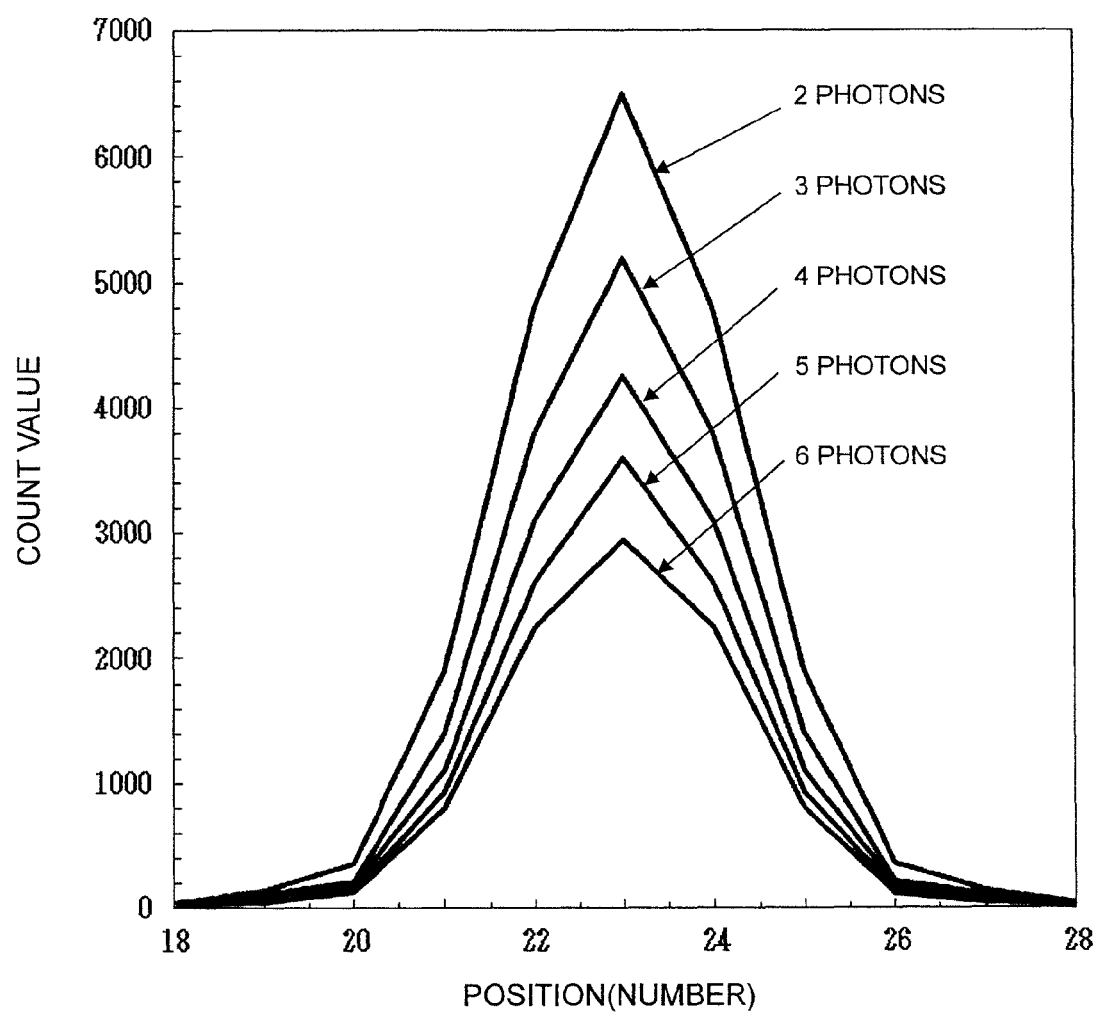
FIG. 12 is a graph showing an example of the peak analysis result by the median point calculating circuit having a photon signal discriminating function in the two-dimensional neutron image detector in case of changing the number of photons.

In order to estimate the characteristics in determining the neutron incident position of the two-dimensional neutron image detector in this embodiment, neutron irradiation experiment was conducted by using cold neutrons having a wavelength of 4 Å at CHOP, Pulsed Neutron Instrument with Disk Chopper, at JRR-3 Research Reactor, Japan Atomic Energy Agency. A Cd (Cadmium)-based collimator plate having a hole having a diameter of 1.1 mm is placed in front of the neutron image detector of this embodiment, and the collimated neutron beam having a diameter of 1.1 mm is made irradiated. FIG. 12 illustrates the measurement and signal processing result of the neutron beam measured by using the median point calculating method according to the present invention in case that the preset discrimination values for the photon count value for the integrated value for the horizontal-axis count values and the integrated value for the vertical-axis count values, respectively, are made identical to each other, and that the preset discrimination value is made change from 2 to 6. This figure is the result of viewing the two-dimensional incident position distribution in the horizontal-axis direction. This figure shows the changes of the peak profile in case that the preset discrimination values for the photon count value for the integrated value for the horizontal-axis count values and the integrated value for the vertical-axis count values, respectively, are made change from 2 to 6. It is proved that the peak profile does not change substantially even if the preset discrimination value for the photon count value changes, and that, as the preset discrimination value for the photon count value changes, the peak area decreases and the detection efficiency for the neutron decreases.

FIG. 13 shows the analysis result of the position resolution for the peak profile for the preset discrimination value for the photon count value, the present discrimination value being changed from 2 to 7. The position resolution for the preset discrimination value for the photon count value being 6 is 0.81 mm while the position resolution for the preset discrimination value being 2 is 1.04 mm, which proves that the position resolution can be improved by 0.23 mm.

(Embodiment 5)

Figure 14A:
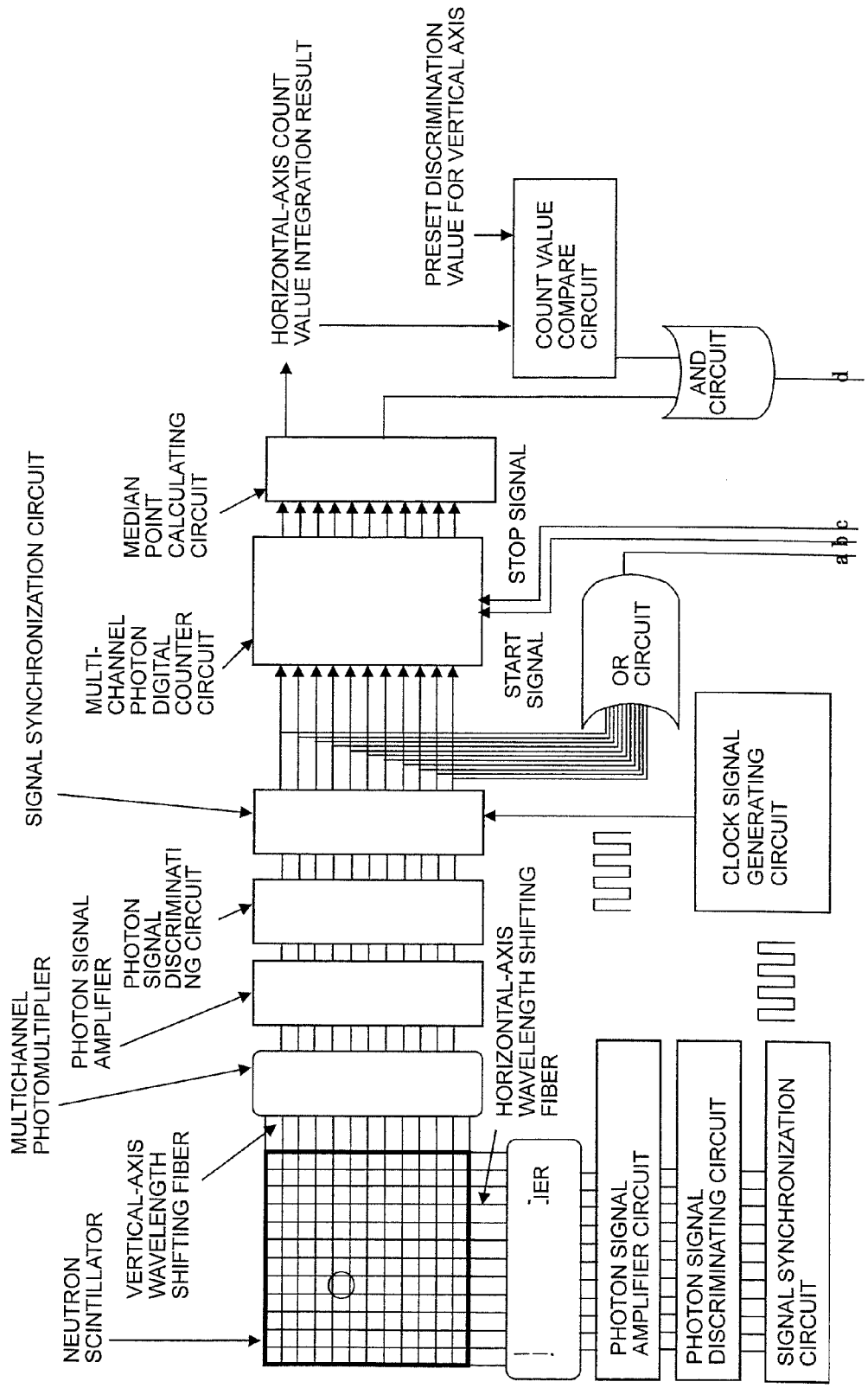
FIG. 14A is a first half of the schematic diagram showing the configuration of the median point calculating circuit having a function for compensating the non-linearity in photon countings in the two-dimensional neutron image detector using ZnS:Ag as a material for the scintillator.
Figure 14B:
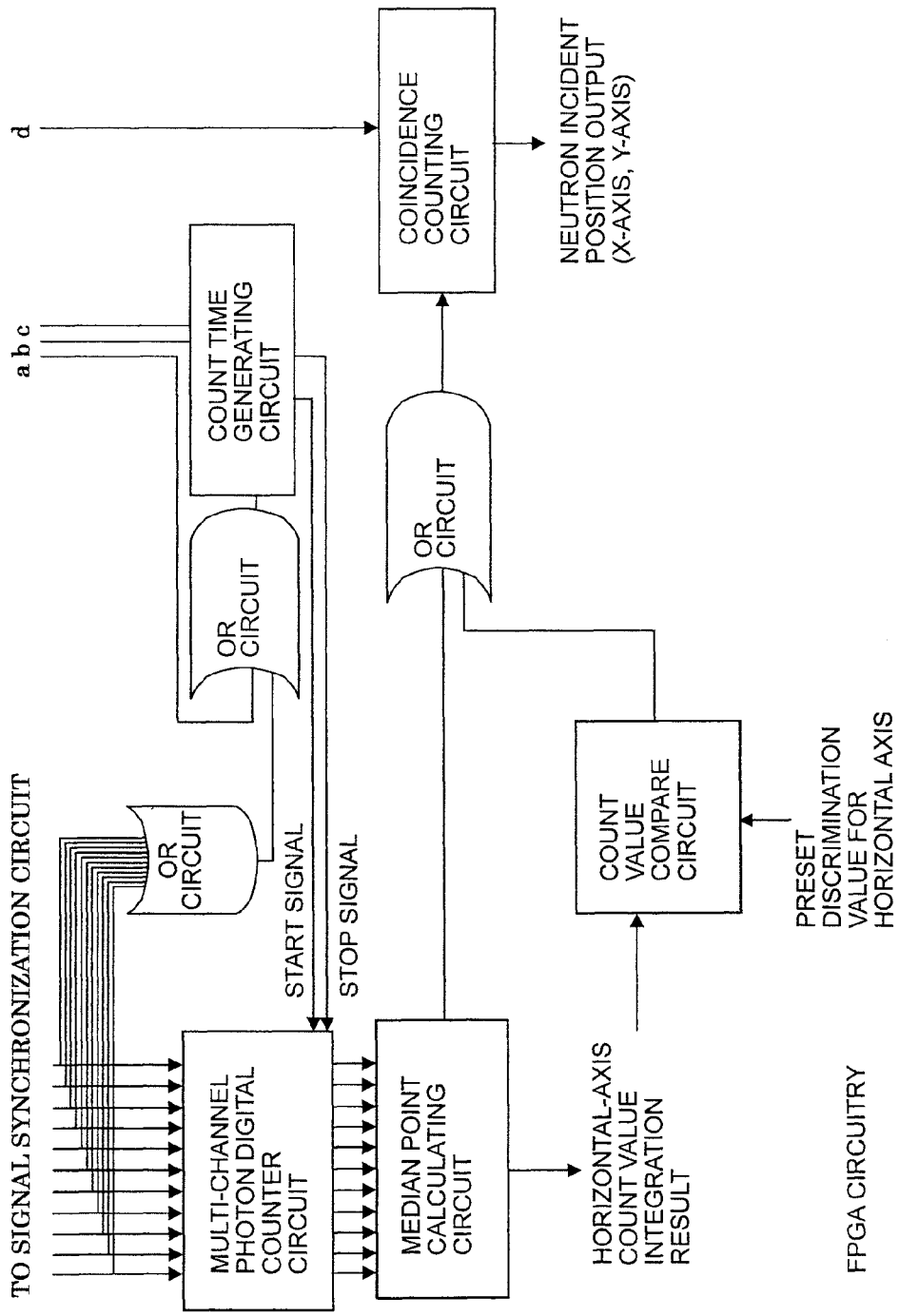
FIG. 14B is a last half of the schematic diagram thereof.
Figures 1, 15A:
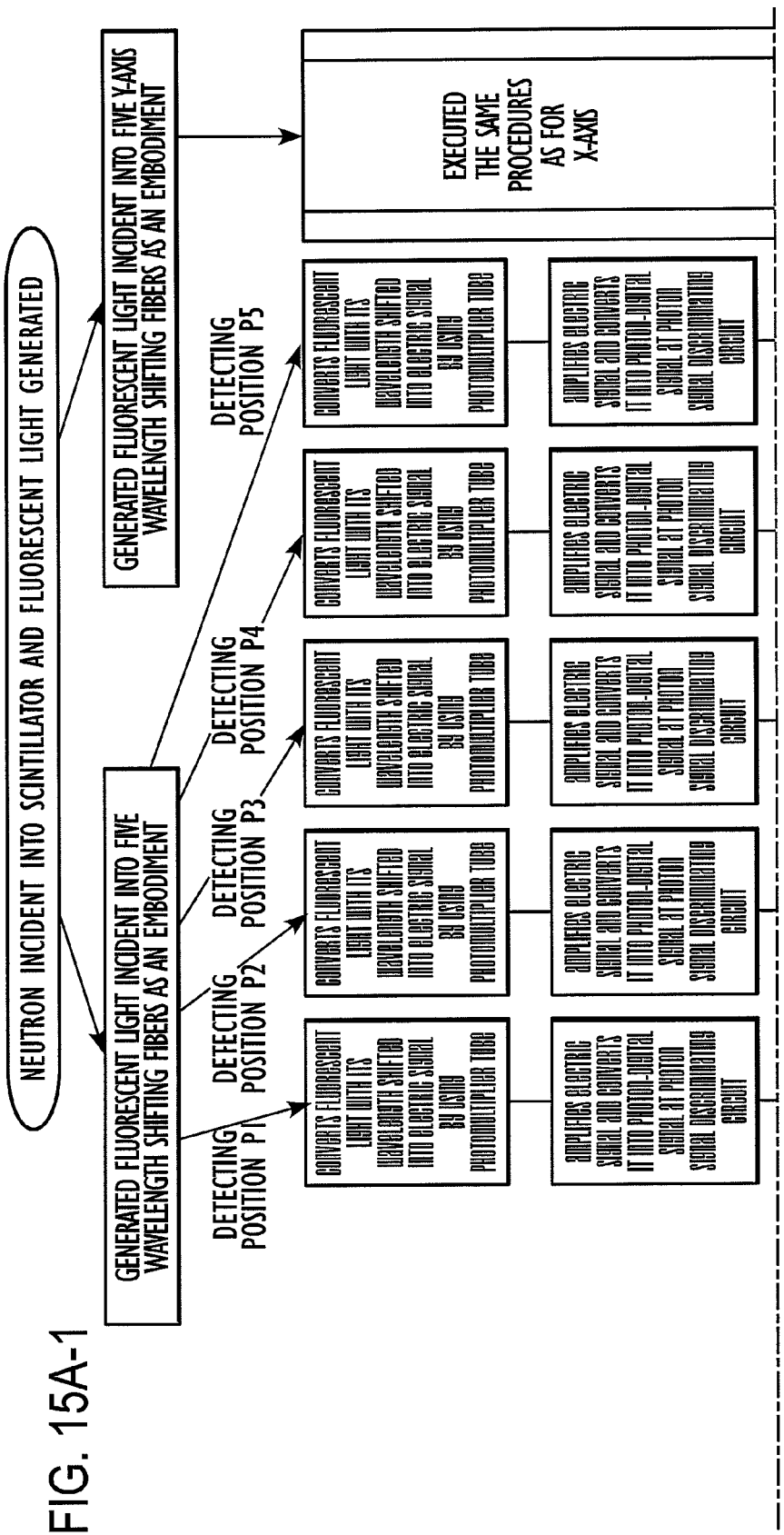
FIG. 15A is a first half of the flow chart of the median point calculation having a function for compensating the non-linearity in photon countings in the two-dimensional neutron image detector using ZnS:Ag as a material for the scintillator.
Figure 15B:
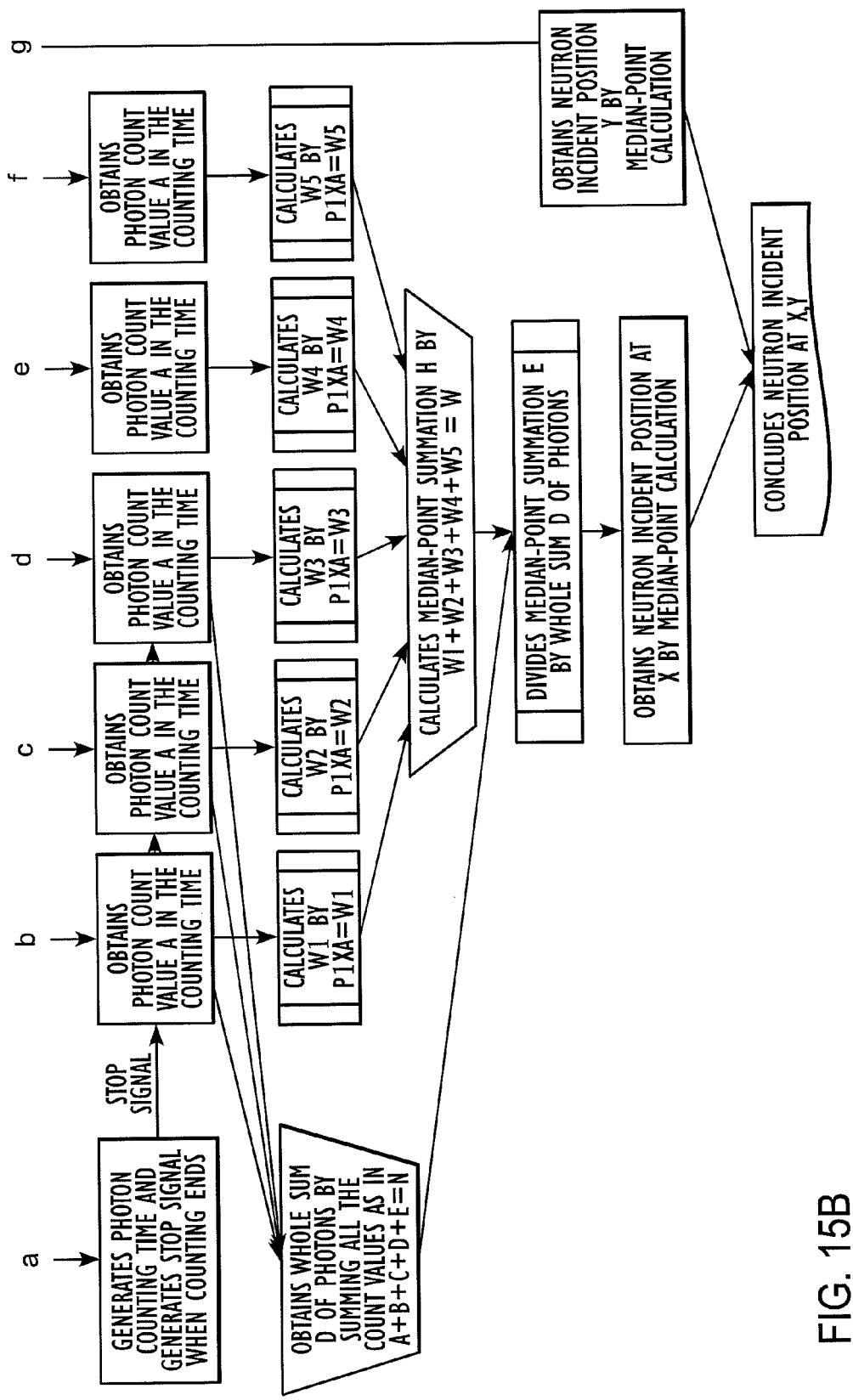
FIG. 15B is a last half of the flow chart thereof.

As Embodiment 5, FIG. 14A and FIG. 14B illustrate schematic diagrams showing the configuration of the median point calculating circuit in the two-dimensional neutron image detector combining a semi-transparent scintillator manufactured by mixing ZnS:Ag fluorescent material, and $^6$LiF or $^{10}B_2O_3$ as a neutron converter and a wavelength shifting fiber according to the present invention. FIG. 15A and FIG. 15B show flow charts of the median point calculation in case that the generated fluorescent light incident into five wavelength shifting fibers for the vertical axis and the horizontal axis, respectively, upon the incidence of a neutron.

The two-dimensional neutron image detector using a scintillator and a wavelength shifting fiber in this embodiment has the same structure as Embodiment 2. Note that the additional function including the signal synchronization circuit and its down stream in the present invention will be now described.

Figure 16:
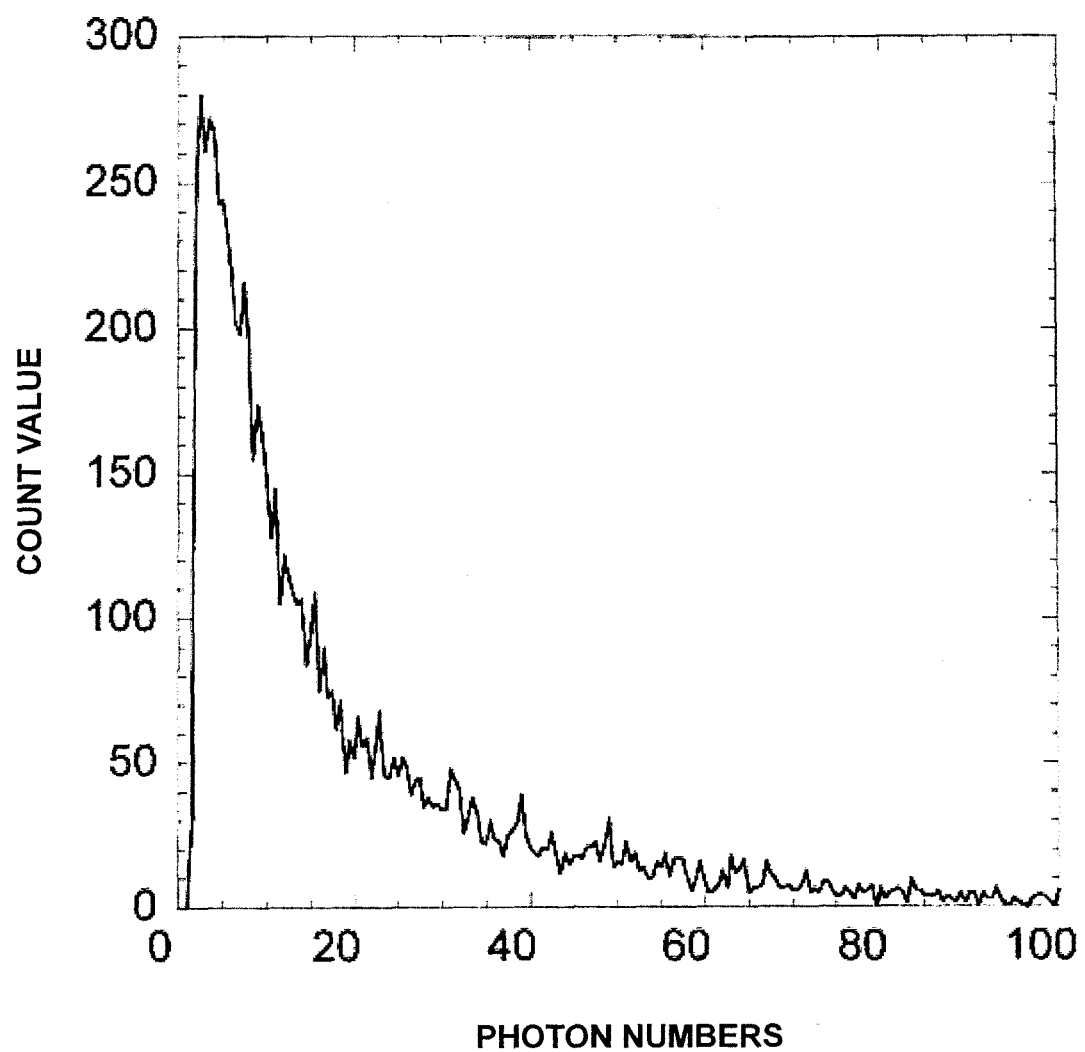
FIG. 16 is a graph showing the result of measuring the wave-height distribution characteristic of the photons detected by the photomultiplier in the fluorescent light from the neutron detecting sheet commercially available from AST in England.

What will be described below is a case of using a semi-transparent scintillator as a neutron scintillator manufactured by mixing ZnS:Ag fluorescent material, and $^6$LiF or $^{10}B_2O_3$ as a neutron converter. The neutron detecting sheet commercially available from AST in England is used as the neutron scintillator, which is manufactured by using ZnS:Ag as fluorescent material, and mixing ZnS:Ag and $^6$LiF with a mixing ratio of 4:1 by binder material. The thickness of the neutron scintillator is 0.45 mm. FIG. 16 shows an example of the measurement result of the photon pulse-height distribution characteristics by detecting the fluorescent light from the neutron scintillator by the photomultiplier tube. It is proved that the number of photons to be used at the median point calculation distributes in the range almost in double-figures from 2 (two) to about 100 (one hundred) when the photon digital signal is generated upon the neutron incident detected by the wavelength shifting fiber, as this neutron scintillator is semi-transparent.

Figure 17:
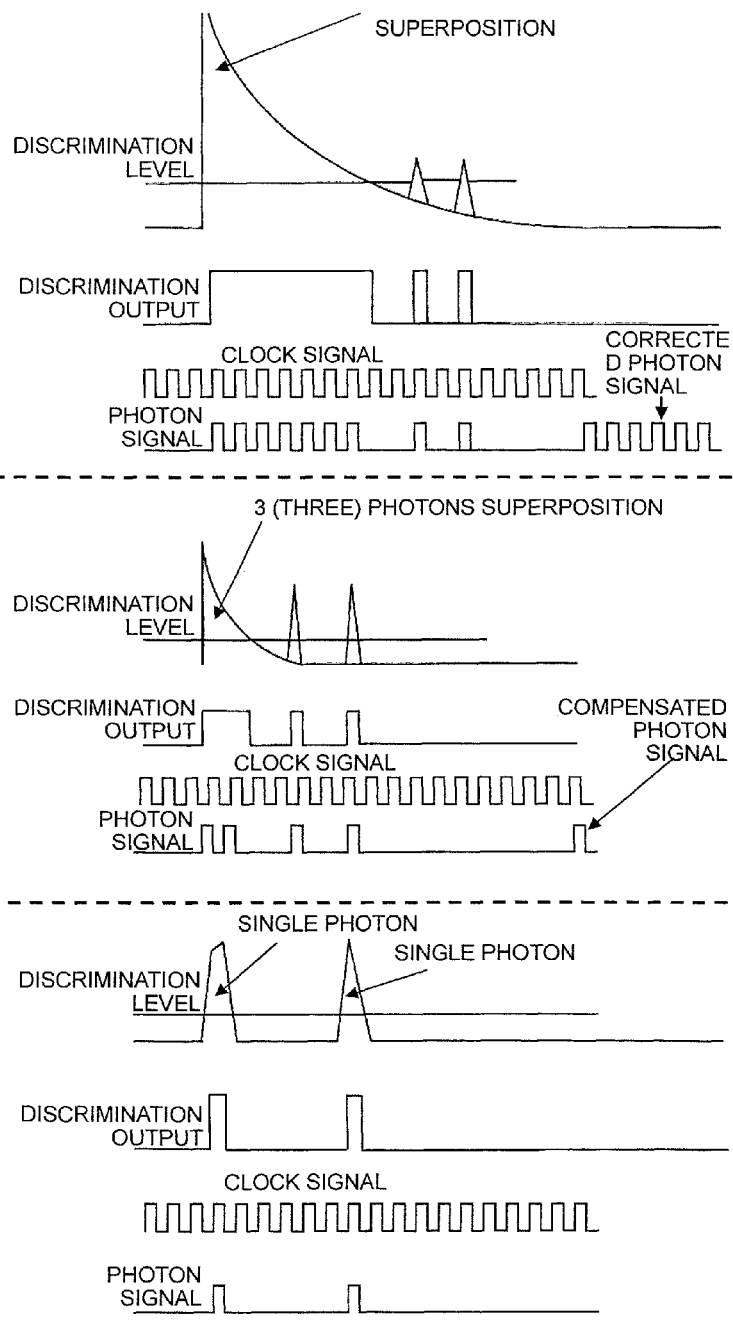
FIG. 17 is an explanatory drawing showing the principle for compensating the non-linearity in photon countings in the two-dimensional neutron image detector using ZnS:Ag as a material for the scintillator.

In such a case as described above, if photons are generated in a very short period of time, the number of photons to be measured may not be measured precisely because several photons are super-positioned on one another in a designated time window. FIG. 17 shows the nonlinearly in photon countings and its compensation method by classifying such photon superposition phenomena into three cases; extremely many photons generated, several photons generated, and photons generated intermittently.

In case that the number of photons is large, as shown in FIG. 17, the discrimination output provides a single digital pulse having a long pulse width, and after that, several photon signals appear intermittently. The photon count number corresponding to the long pulse width of the digital pulse is obtained by using the signal synchronization circuit with the clock signals. However, the super-positioned photons can not be measured precisely.

Based on the fact that the life-time of the fluorescent light generated from the fluorescent material is known, and that the relation between the discrimination levels in the photon signal discriminating circuit and the continuous pulse width of the digital pulse output from the photon signal discriminating circuit, the exact number of photons implied by the super-positioned photon signal pulses is estimated by using the life-time of the fluorescent light. In case that the number of fluorescent lights is relatively small as shown at the center part of FIG. 17, the exact number of photons can be also estimated by compensating the measured number of photons.

Referring to the short life-time component of the fluorescent light from ZnS:Ag fluorescent material, 0.3 µs, the exact number of photons implied by the super-positioned photon signal pulses was estimated based on the relation between the relation between the discrimination levels in the photon signal discriminating circuit and the continuous pulse width of the digital pulse output from the photon signal discriminating circuit. A simple exponential function is used as the life-time decay curve. The discrimination level is so defined that the photon digital signal may accommodate the separately identifiable photon signal output from the amplifier with 90% fraction.

Figure 18:
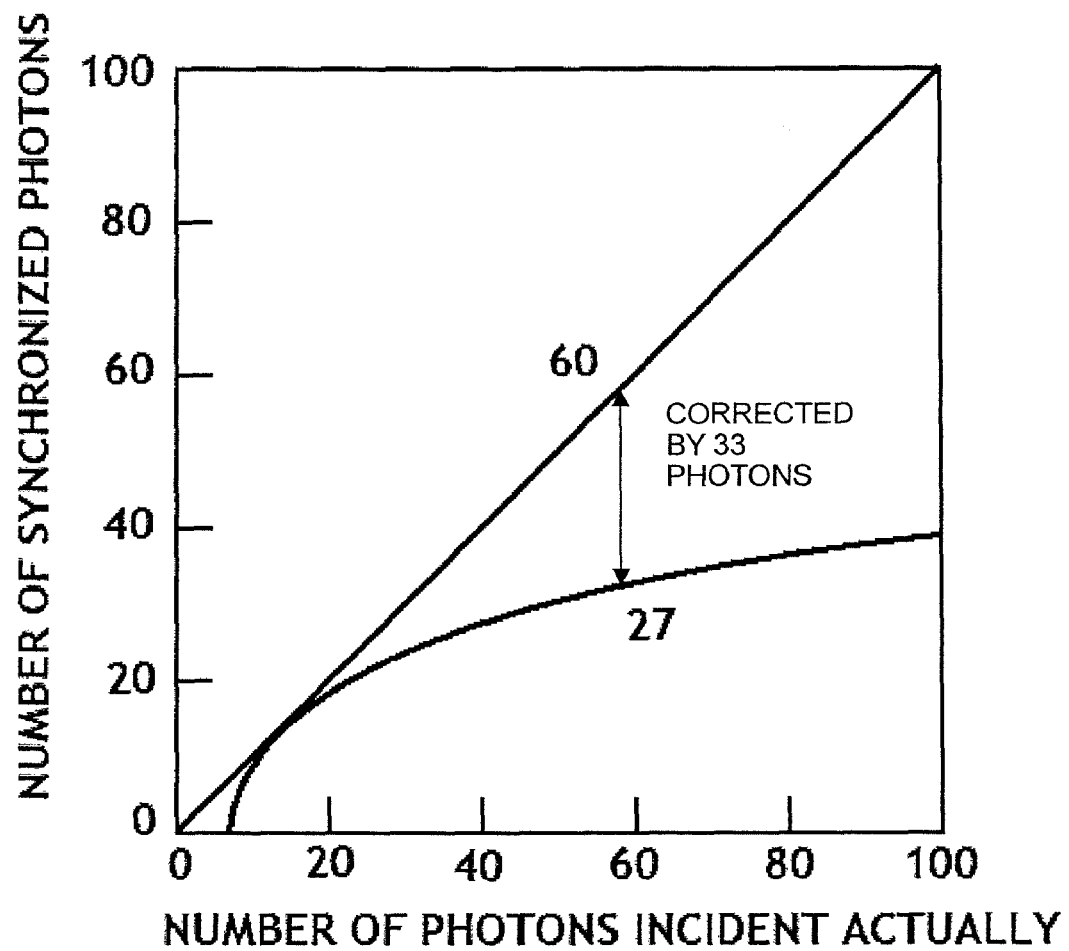
FIG. 18 is a graph showing an example of calculating the correction amount in the photon count number for compensating the non-linearity in photon countings in the two-dimensional neutron image detector using ZnS:Ag as a material for the scintillator.

FIG. 18 shows the relation between the exact number of incident photons to be estimated according to the above described conditions and the measured number of synchronized and output photons. As the ideal relation between those entities is shown as the proportional line in FIG. 18, the difference between the proportional line and the estimated curve is the number of photons to be used for compensation. For example, assuming that the exact number of incident photons is 60, the compensated number to the actually measured number of photons is 33, which is almost equal to the actually measured number, 27.

In practical applications, in order to compensate the non-linearity, some compensation and conversion formula or conversion table may be used for the median point calculation as shown in the flow chart of median point calculation in FIG. 15 at the linearity compensation circuit shown in FIG. 14, and some false pulse may be generated corresponding to the input photon count numbers as shown in FIG. 17 illustrating an explanatory drawing for the principle of compensating the non-linearity.

(Embodiment 6)

Figure 19:
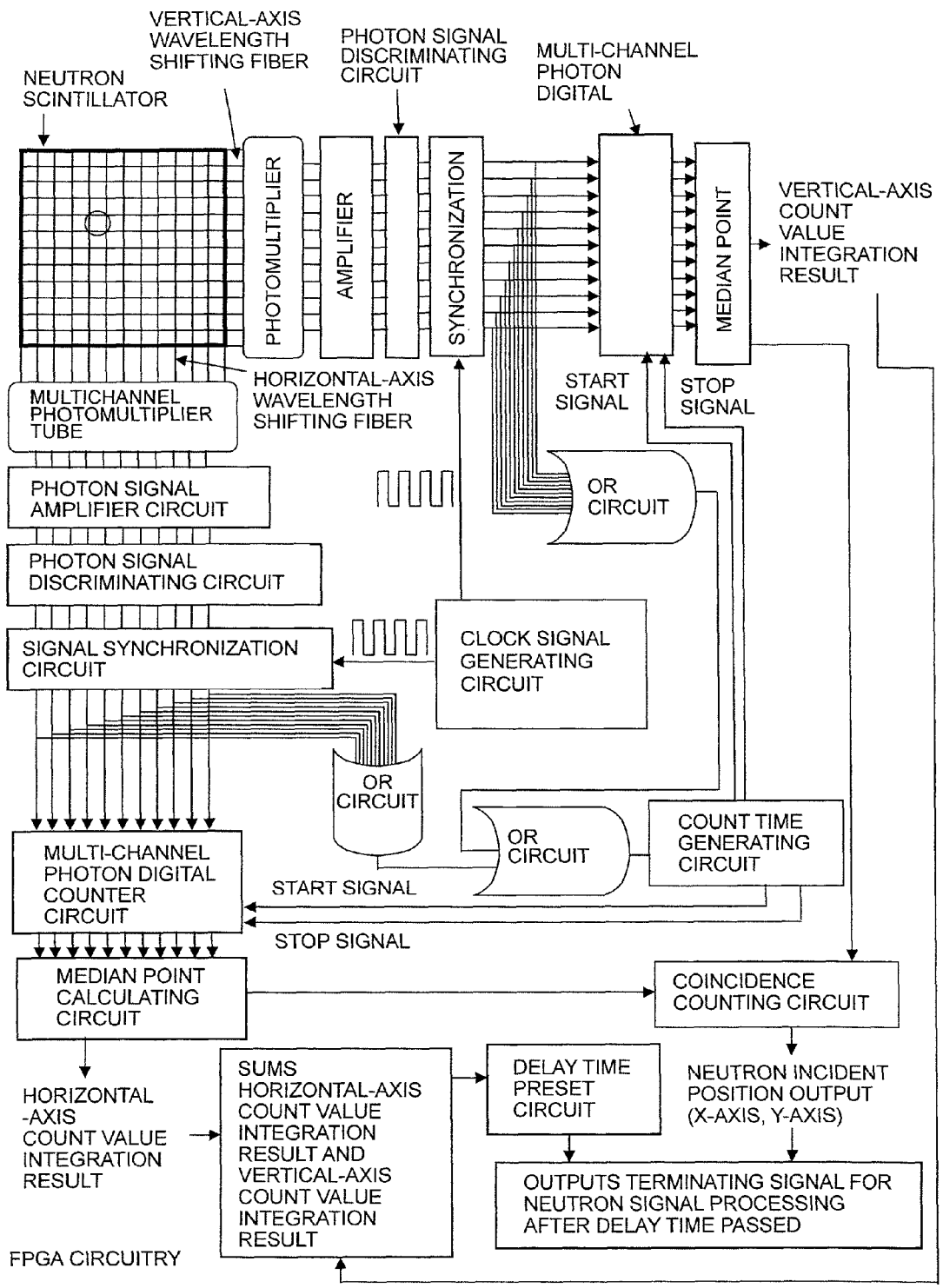
FIG. 19 is a schematic diagram showing the circuit configuration for removing the multiple countings due to after-glow by forcing time-delay after the median point calculation in the two-dimensional neutron image detector using ZnS:Ag as a material for the scintillator.
Figure 20A:
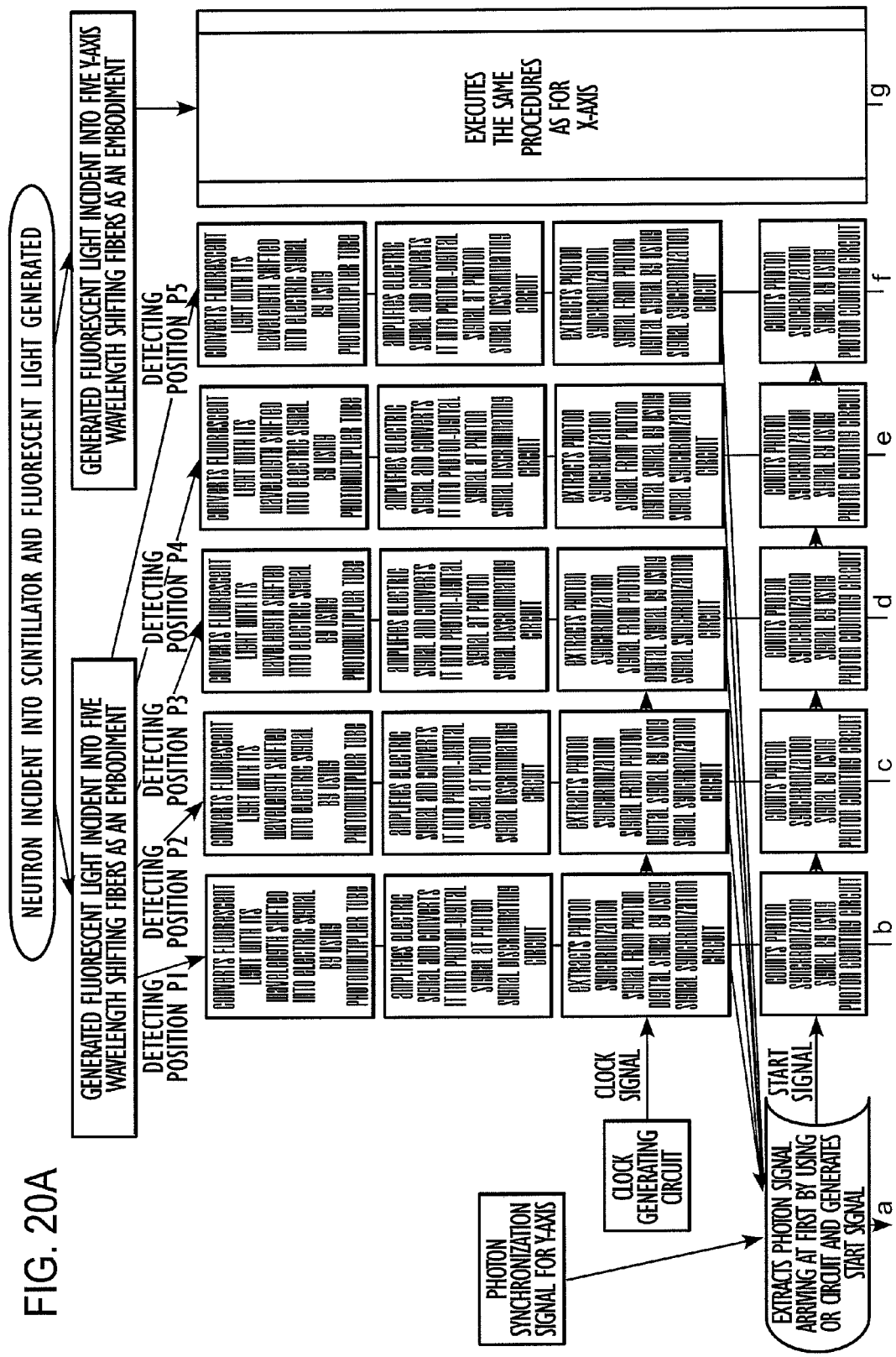
FIG. 20A is a first half of the flow chart of the operation in the multiple countings removing circuit shown in FIG. 19.
Figure 20B:
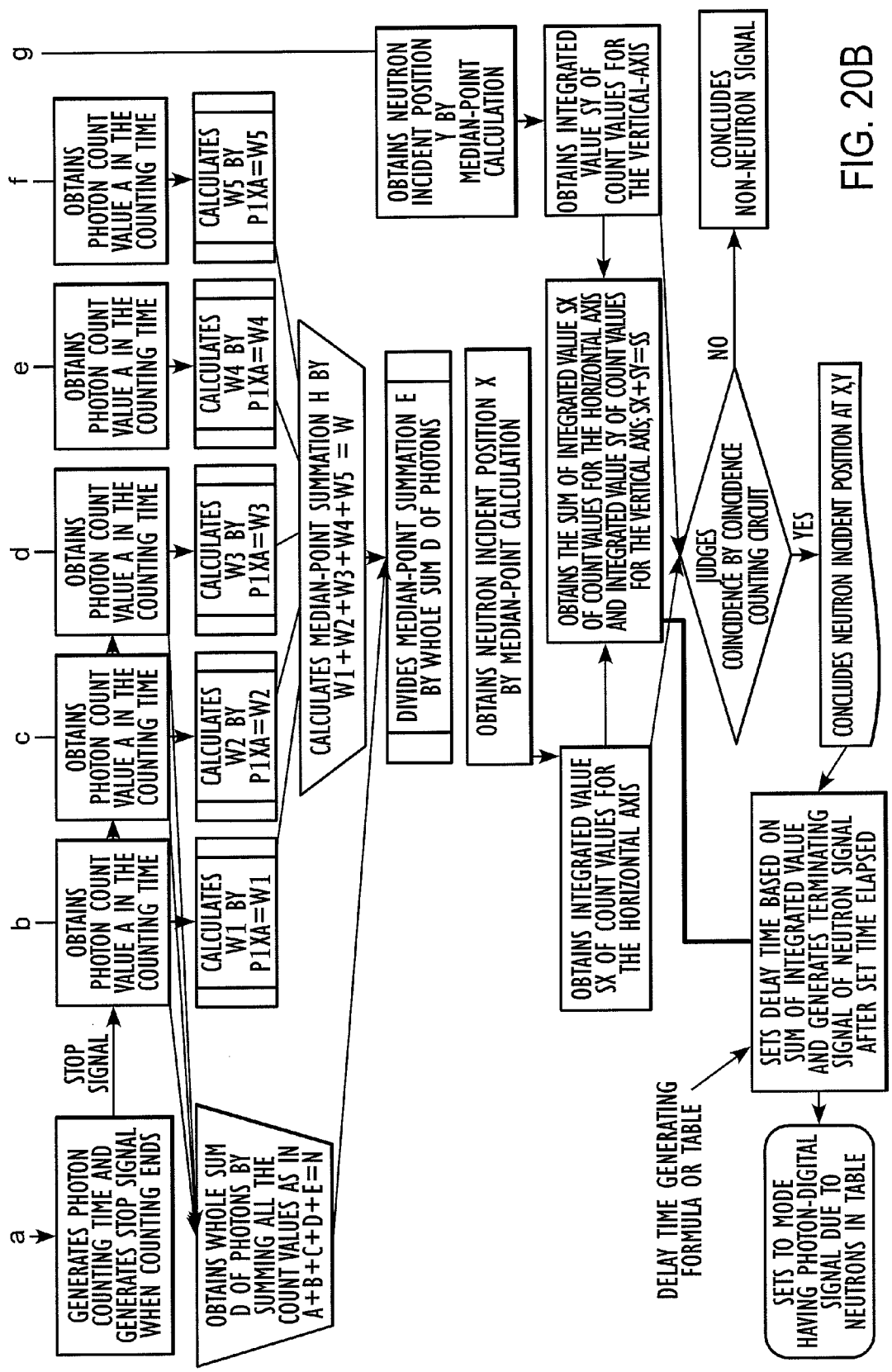
FIG. 20B is a last half of the flow chart thereof.

As Embodiment 6, FIG. 19 illustrates a schematic diagram showing the circuit configuration for removing the multiple countings due to after-glow (The life-time of the short life-time component of the fluorescent light is 70 µs) after the median point calculation with the time-delay circuit in the two-dimensional neutron image detector combining a semi-transparent scintillator manufactured by mixing ZnS:Ag fluorescent material, and $^6$LiF or $^{10}B_2O_3$ as a neutron converter and a wavelength shifting fiber according to the present invention. FIG. 20A and FIG. 20B show flow charts of the process performed in the circuit configuration example when of the median point calculation in case that the generated fluorescent light incident into five wavelength shifting fibers for the vertical axis and the horizontal axis, respectively, upon the incidence of a neutron.

The two-dimensional neutron image detector using a scintillator and a wavelength shifting fiber in this embodiment has the same structure as Embodiment 2. Note that the additional function including the median-point calculating circuit and its down stream in the present invention will be now described.

What will be described below is a case of using a semi-transparent scintillator as a neutron scintillator manufactured by mixing ZnS:Ag fluorescent material, and $^6$LiF or $^{10}B_2O_3$ as a neutron converter in the similar manner to Embodiment 5. The neutron detecting sheet commercially available from AST in England is used as the neutron scintillator, which is manufactured by using ZnS:Ag as fluorescent material, and mixing ZnS:Ag and $^6$LiF with a mixing ratio of 4:1 by binder material. The thickness of the neutron scintillator is 0.45 mm. Refer to FIG. 16 for the example of the measurement result of the photon pulse-height distribution characteristics by detecting the fluorescent light from the neutron scintillator by the photomultiplier tube. It is proved that the number of photons to be used at the median point calculation distributes in the range almost in double-figures from 2 (two) to about 100 (one hundred) when the photon digital signal is generated upon the neutron incident detected by the wavelength shifting fiber, as this neutron scintillator is semi-transparent.

In such a case as described above, the larger the number of photons, the more after-glow remain in the ZnS:Ag fluorescent material, and therefore, the remaining after-glow component causes multiple countings (two or more neutron incident countings are obtained per neutron incident) in case of applying the signal processing using such a photon counting method as the present invention.

In order to remove such multiple countings, it is required to make the signal processing circuit into a ready state for counting the subsequent neutron incident after completing the previous neutron incident counting. It is possible to remove such multiple countings not by making the processing circuit into a ready state immediately, but by delaying the initiation of the ready state of the processing circuit with an optimal delay time by using the delay circuit.

Figure 21:
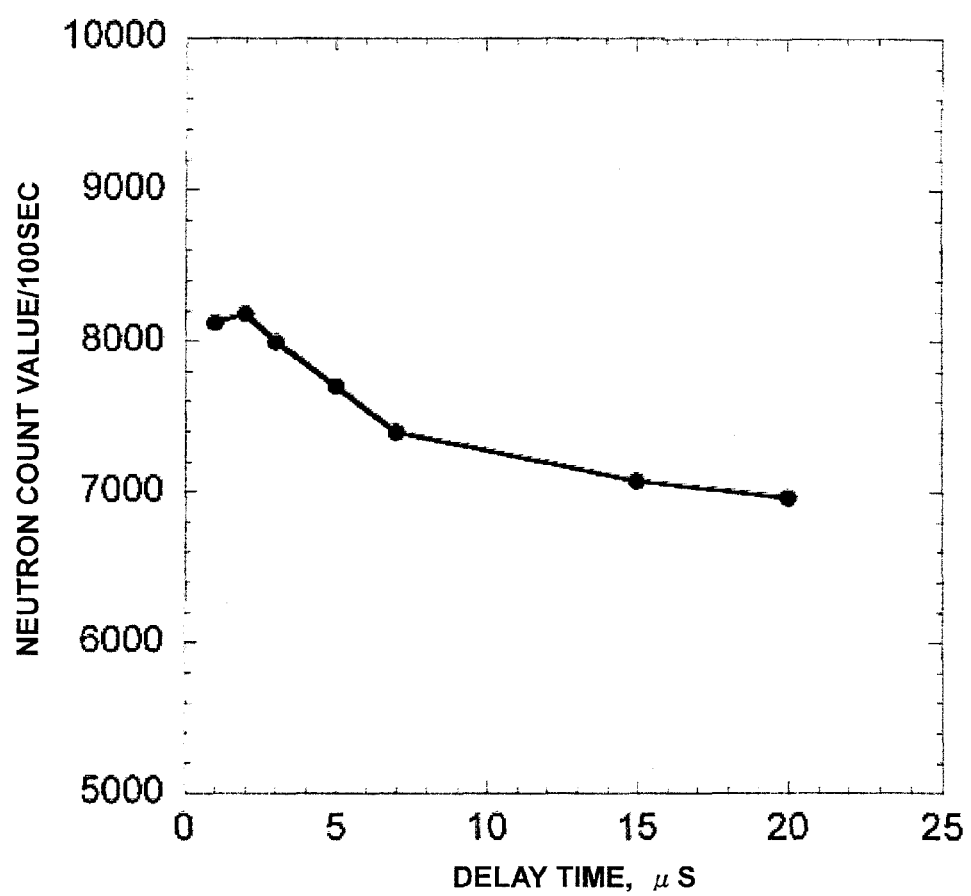
FIG. 21 is a graph showing the example of the actual measurement of the count values in case of changing the delay time in the multiple countings removing circuit shown in FIG. 19.

The probability for the multiple countings can be obtained by actual measurement by changing the actual delay time to initiating the ready state of the processing circuit and by observing the multiple countings by using the actual neutron image detector. FIG. 21 shows the relation between the delay time and the actual number of neutron countings as the raw data in the experimental result. The measurement condition assumes such a basic case that one or more photons enter the horizontal axis and one or more photons enters the vertical axis at the neutron image detector. It is observed that the neutron counting per 100 seconds is 8200 for the delay time of 2 µs though the neutron counting is 7000 for the enough delay time of 20 s. It is proved that a fraction of multiple countings to the overall countings is 16% for the delay time of 2 µs.

Figure 22:
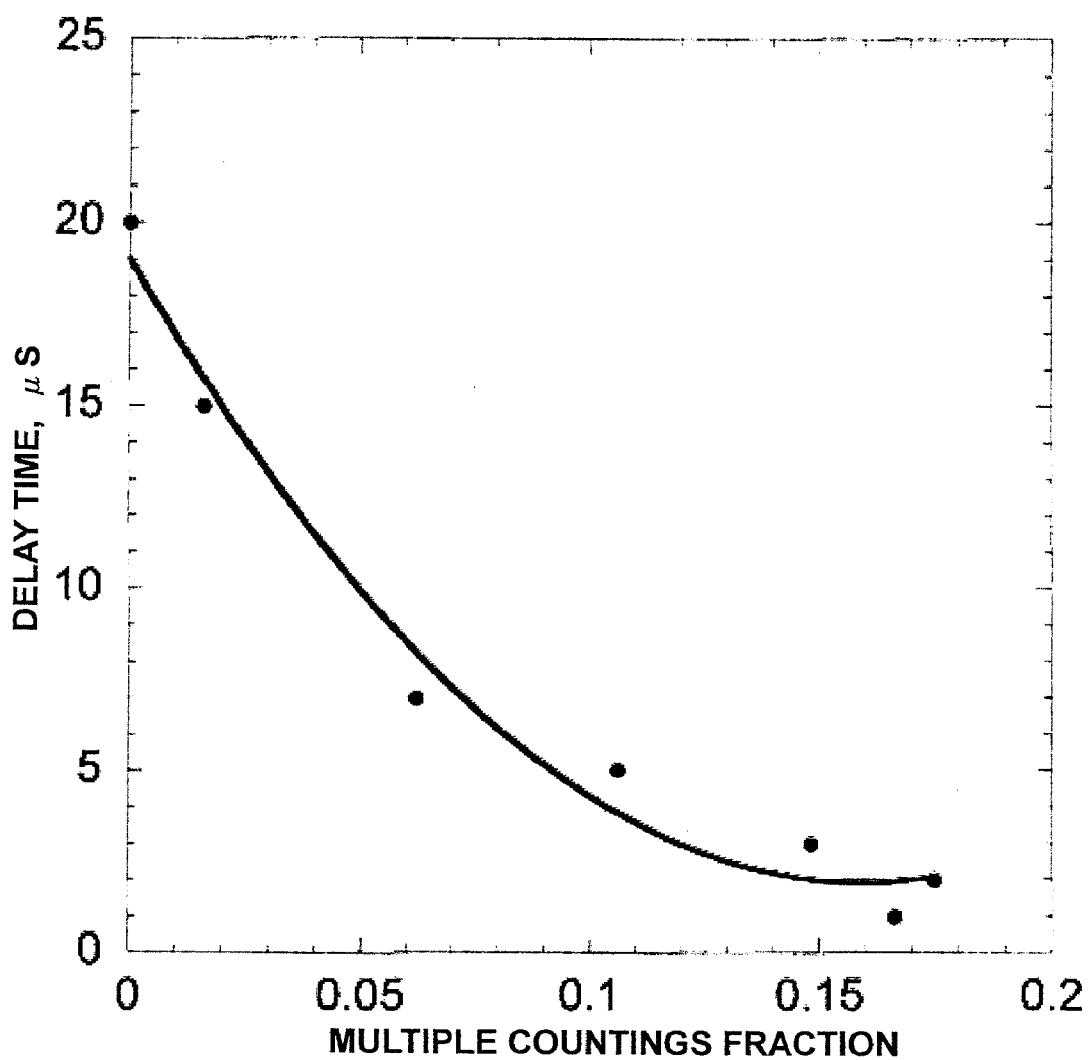
FIG. 22 is a graph showing the actual measurement data illustrating the relation between the multiple countings fraction due to after-glow and the delay time based on the experimental values obtained by forcing time-delay after the median point calculation in the two-dimensional neutron image detector using ZnS:Ag as a material for the scintillator.

FIG. 22 shows a fitting curve showing the relation between the fraction of multiple countings and the delay time on the basis of raw data described above. According to the figure, the fraction of multiple countings gets to as large as 16% in case of applying the delay time of 2 µs unconditionally. On the other hand, the fraction of multiple countings is as low as 1% in case of applying the delay time of 20 µs, which fails to establish neutron image detection with a higher counting rate because of the increased dead time.

In order to solve such a problem as described above in the present invention, the delay time is so defined as to correspond to the optimal number of photon count value on the basis of the overall number of measured photons in the experiment. As shown in the circuit configuration illustrated in FIG. 19 and the signal flow chart illustrated in FIG. 20A and FIG. 20B, the delay time is so preset at the median point calculating circuit as to correspond to the sum of the integrated value for the vertical-axis photon count values and the integrated value for the horizontal-axis photon count values, and the initiation of the ready state for detecting the subsequent neutron incident is delayed by the delay time.

The delay time to be preset is determined by analyzing the experimental result as described below. The relation between the delay time and the fraction of multiple countings to the overall countings is required at first, which can be prepared by using the relational expression in FIG. 22 as described above.

Figure 23:
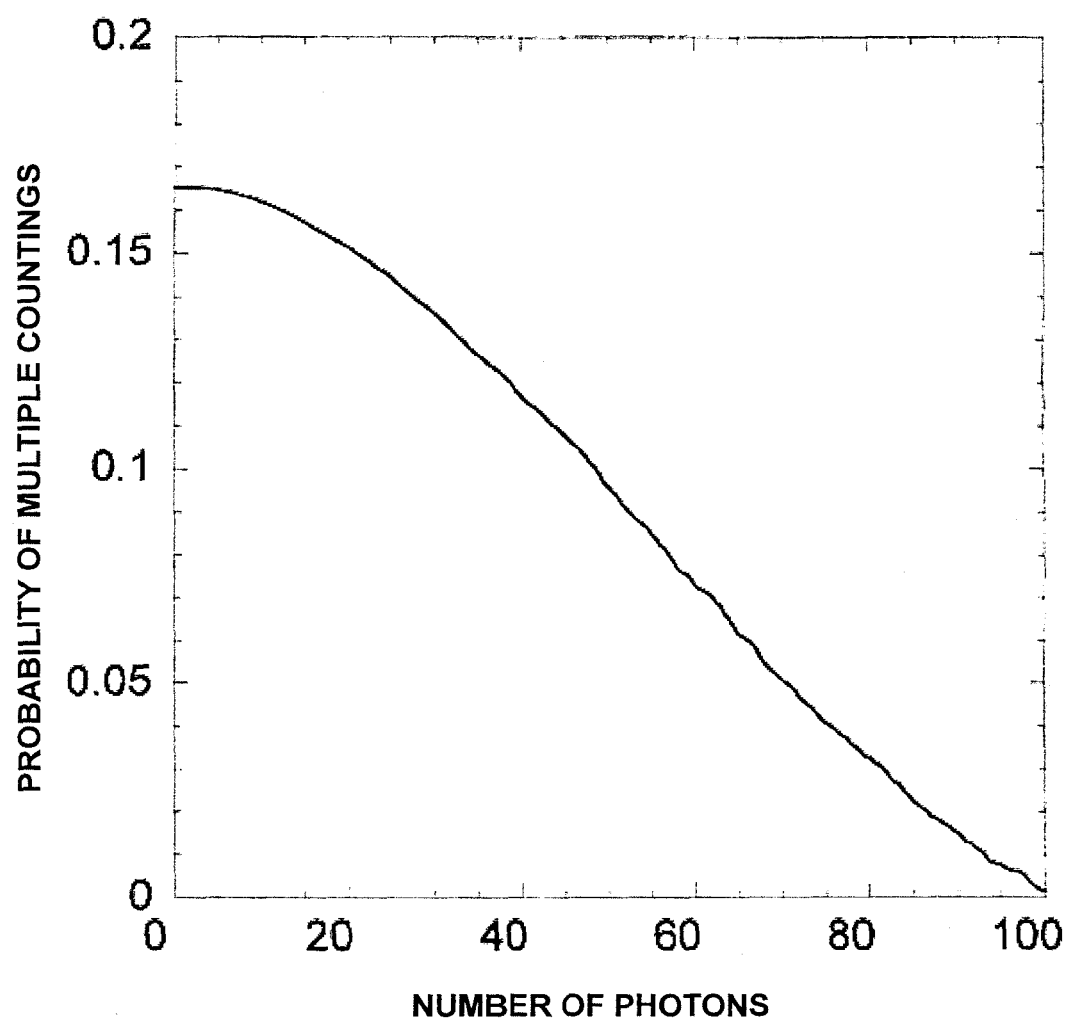
FIG. 23 is a graph showing the example of calculating the multiple countings due to after-glow based on the wave-height distribution in the scintillator using ZnS:Ag fluorescent material.

The relation between the overall photon countings and the multiple photon countings is obtained by normalizing the fraction of multiple countings so that the fraction of multiple countings may be 0.16 for 2 (two) photons, assuming that the fraction of multiple countings is proportional to a square of the number of photons and using the photon distribution in the ZnS-based scintillator as shown in FIG. 16. The measurement condition assumes such a basic case that one or more photons enter the horizontal axis and one or more photons enters the vertical axis at the neutron image detector. FIG. 23 shows the relation between the obtained number of photons and the probability, that is, occurrence rate of multiple countings.

Figure 24:
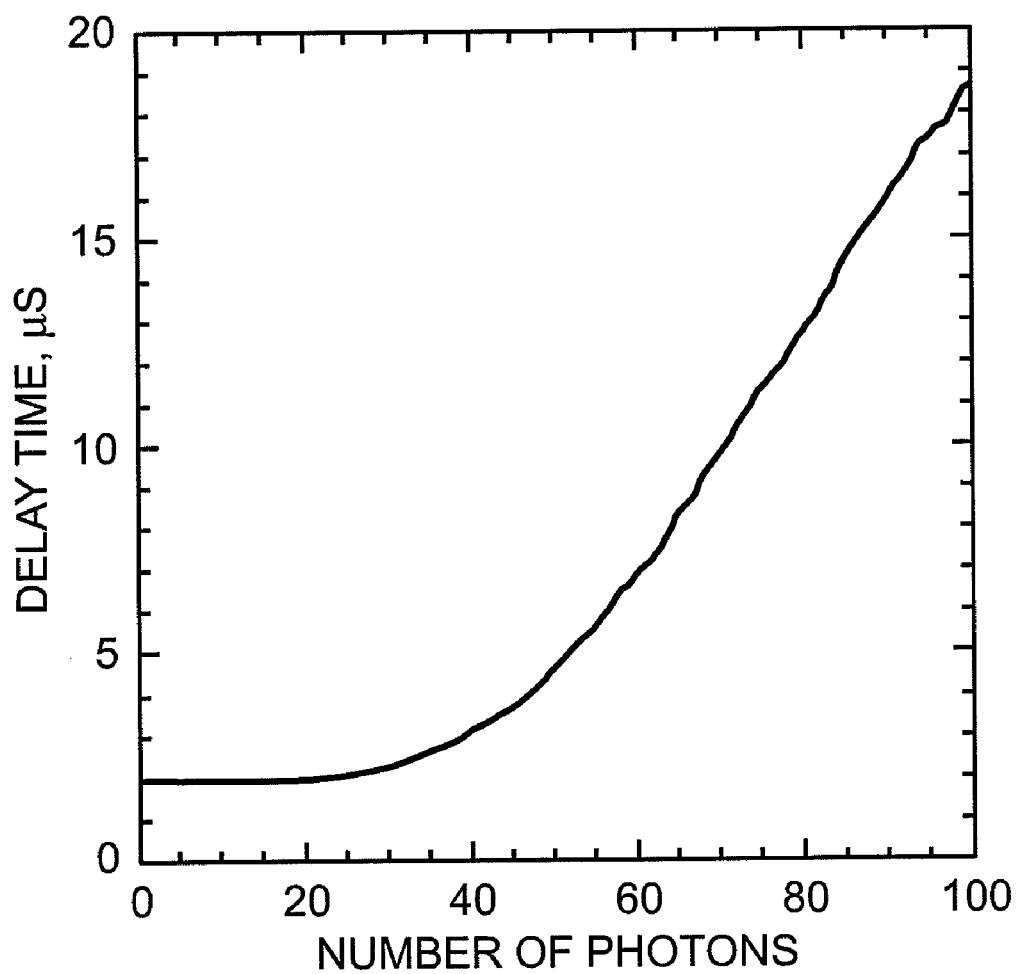
FIG. 24 is a graph showing the relation between the optimal delay time and the photon count number based on the experimental result for the delay time.

Assuming that the fraction of multiple countings in the relational expression between the fraction of multiple countings obtained by referring to FIG. 22 is identical to the occurrence rate of multiple countings in the relational expression between the occurrence rate of multiple countings and the number of photons obtained by referring to FIG. 23, the relation between the number of photons and the required delay time can be obtained by combining those relational expressions. FIG. 24 shows the computational result. It is proved that the delay time of 2 μs can be applied for the number of photons, 20 or smaller, and that the delay time should be increased linearly as the number of photon count number increases from 20 and more.

By means that this relational expression is implemented as the table or the relational expression into the delay-time preset circuit shown in FIG. 19, such a neutron image detector can be realized so that the delay time may be adjusted in response to the measured number of photons on the basis of the flow chart shown in FIG. 20. Owing to this configuration and process, it will be appreciated that such a two-dimensional neutron image detector having such a performance as being compliant to high-rate counting measurement can be obtained so that the counting loss may be as low as possible, the multiple countings due to the after-glow in the ZnS:Ag fluorescent material may be removed.

(Embodiment 7)

Figure 25:
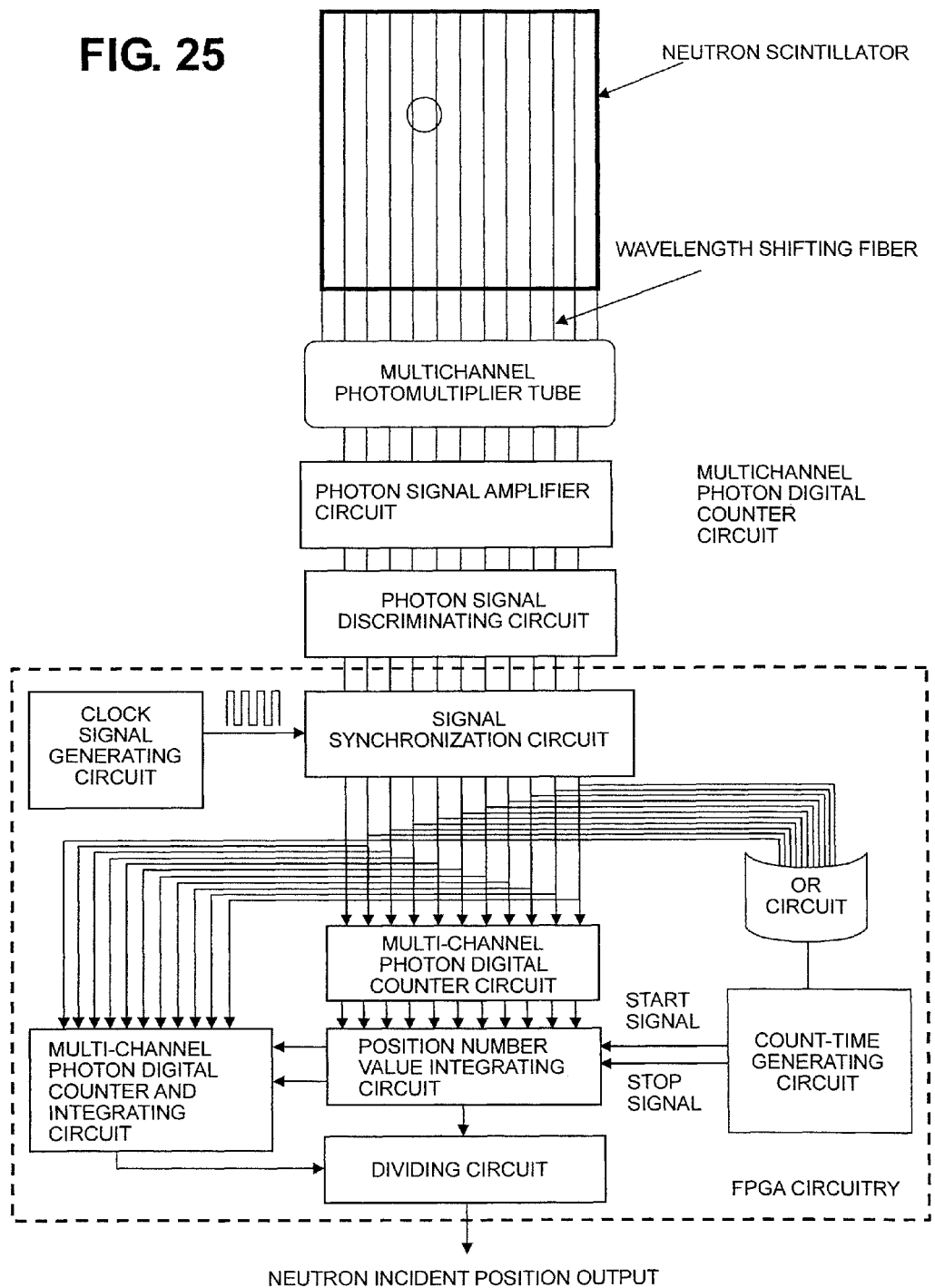
FIG. 25 is a schematic diagram showing the configuration of the median point calculating circuit for calculating the median point without using a circuit for multiplying the photon synchronization signal and the corresponding position number values.
Figure 26A:
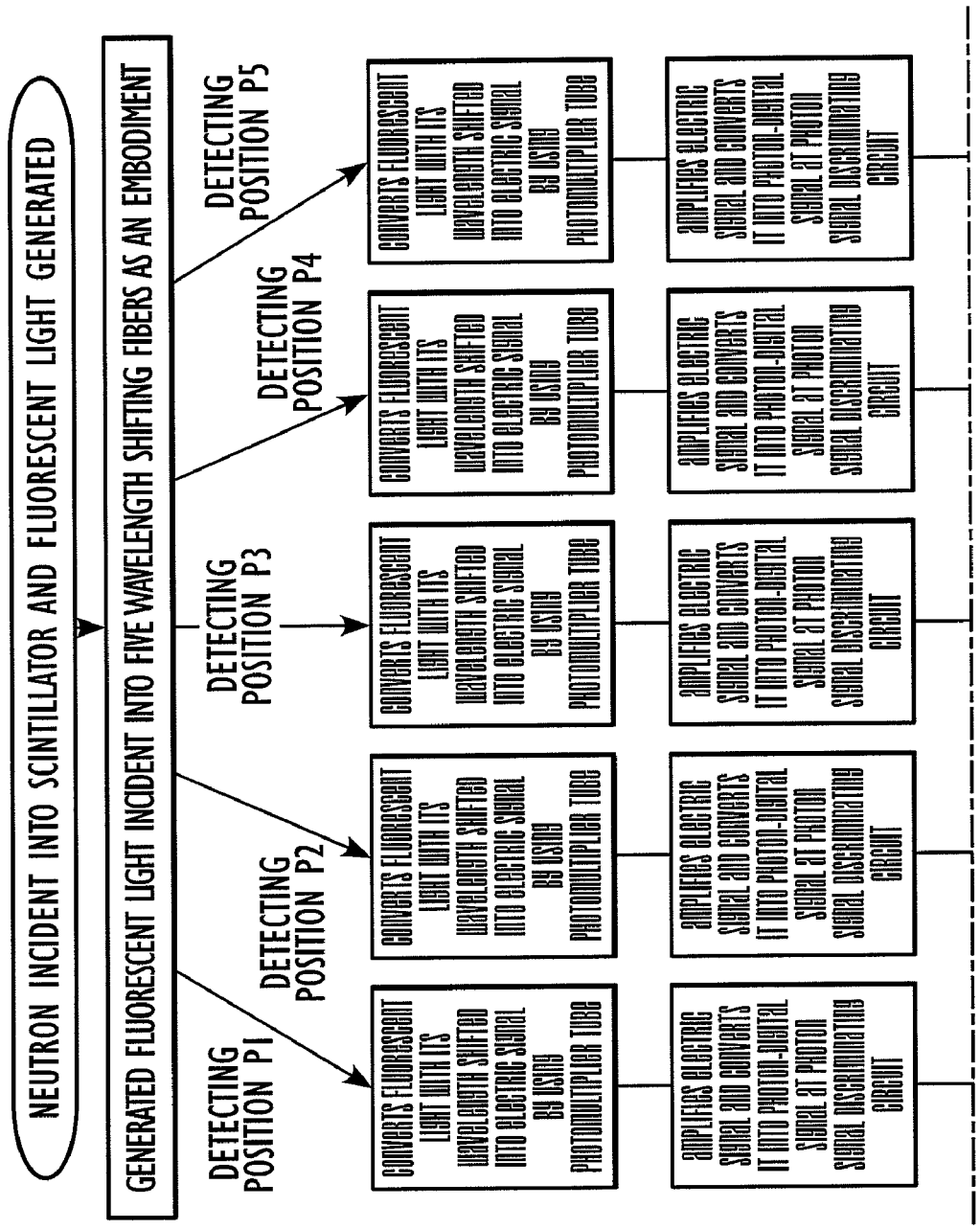
FIG. 26 is a flow chart of the calculation process in the median point calculating circuit shown in FIG. 25.
Figure 26B:
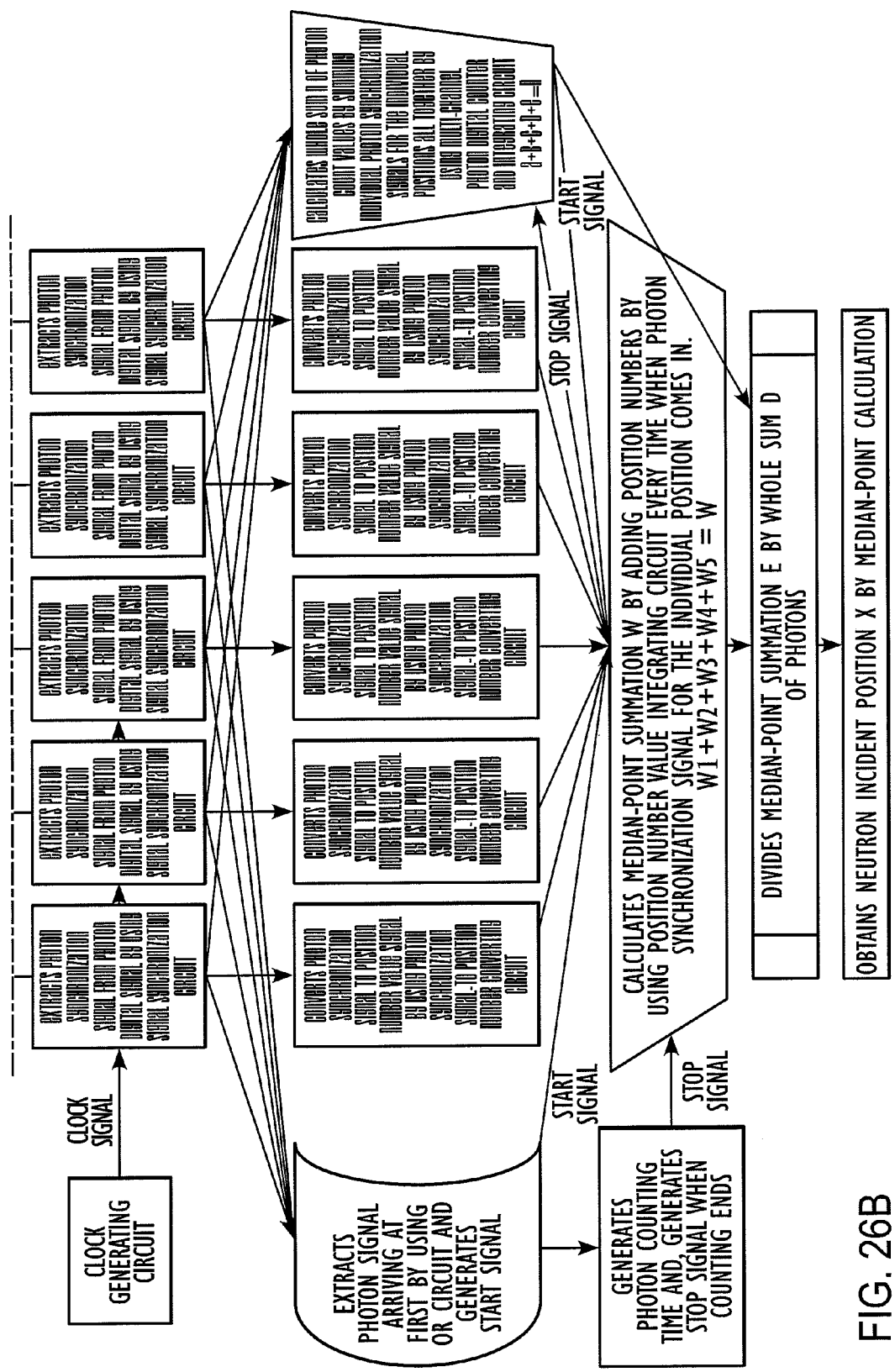
Figure 27:
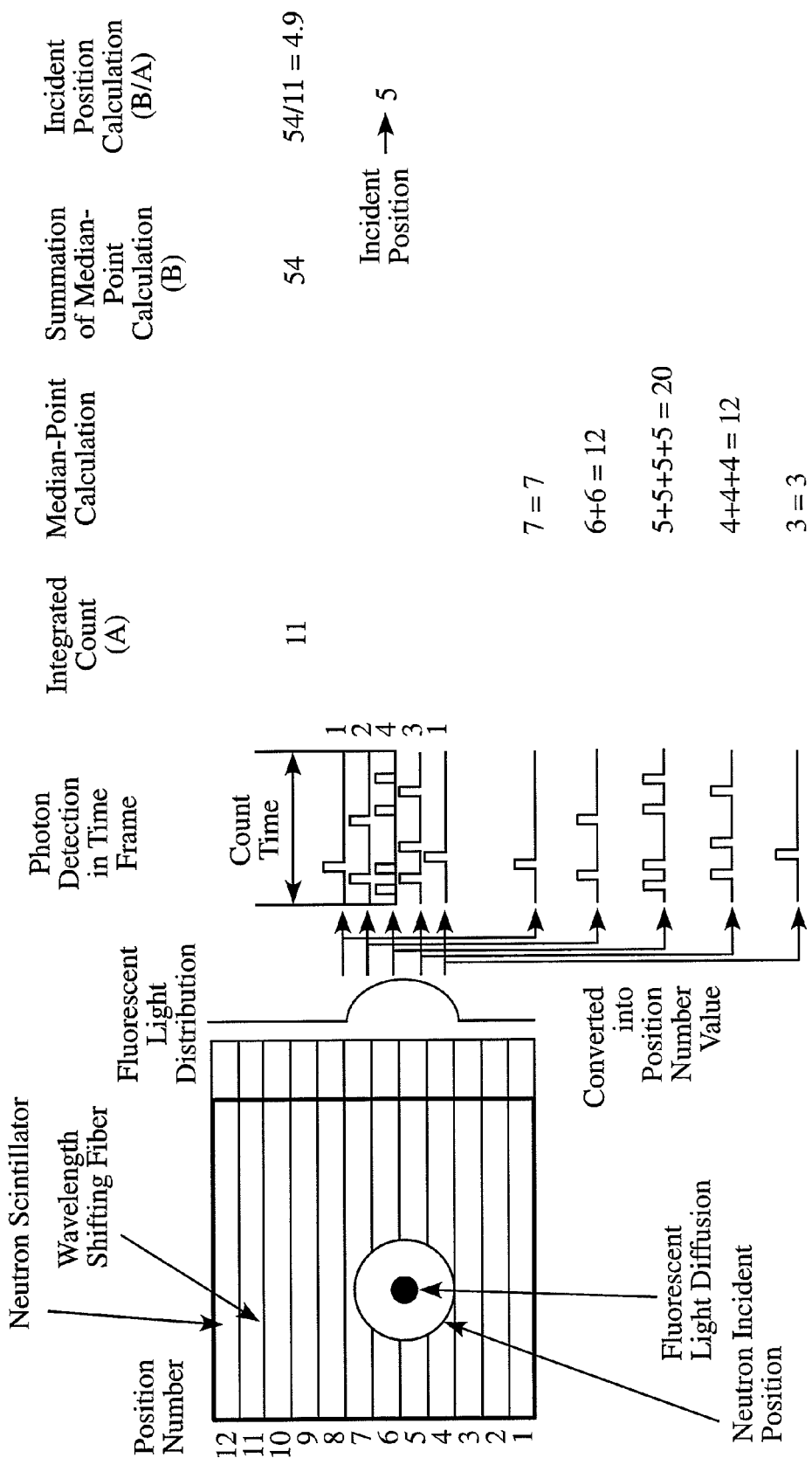
FIG. 27 is an illustrative diagram showing the calculation example of the median point calculating circuit shown in FIG. 25.

As Embodiment 7, FIG. 25 illustrates a schematic diagram showing the configuration of the median point calculating circuit in the one-dimensional neutron image detector using a scintillator and a wavelength shifting fiber. FIG. 26 shows a flow chart of the median point calculation in case that the generated fluorescent light incident into five wavelength shifting fibers upon the incidence of a neutron. FIG. 27 shows a calculation example for the median point calculation based on the principle of mapping the synchronized photon signal to the position number value in calculating the median point without using the multiplication circuit.

The one-dimensional neutron image detector using a scintillator and a wavelength shifting fiber in this embodiment has the same structure as Embodiment 1. Note that the additional function including the signal synchronization circuit and its down stream in the present invention will be now described.

In the median point calculating circuits described above in Embodiments 1 to 6, as described in the calculation example for the median point calculating circuit shown in FIG. 3, the integrated count value of photons for the individual position is obtained by adding operation to the number of photons at the individual position on the basis of the photon count value at the individual incident position stored at the multi-channel photon digital counting circuit. Next, multiplication operation of the photon count value at the individual position and the corresponding position number value is performed and the resultant products are summed to obtain the photon median point count value summation. Those calculations require complicated circuits and computational times, and thus, it takes a longer time to determine the incident position on the basis of overall median point calculations, which fails to establish neutron image detection with a higher counting rate because of the increased dead time.

The logical "OR" operation is applied to all the synchronized photon signals, each synchronized to one another, for all of 64 channels by "OR" circuit at first, and then, the timing when the pulse signal arrives at first to the input to "OR" circuit among the photon digital pulse signals obtained by detection and signal processing upon the incident of a neutron is defined to be the neutron incident time, and is made input to the count-time generating circuit. The count-time generating circuit supplies this first-arriving pulse signal as the start-time signal to the multi-channel photon digital counting circuit which starts the counting operations at the individual channels and summing operation for those count values, and also supplies this start-time signal to the position number value integrating circuit in order to start integrating operation for the position number values.

All the synchronized photon signals are input to the multi-channel photon digital counting circuit, and resultantly the integrated count value of photons can be obtained. At the same time, all he synchronized photon signals are input also to the photon synchronization signal-to position number converting circuit. The photon synchronization signal-to position number converting circuit generates the position number value corresponding to the individual incident position for the photon synchronization signal. The individual position number values generated above are input to the position number value integrating circuit, and resultantly the photon median point count value summation can be obtained.

The circuit for observing the predetermined count out time in the count-time generating circuit starts at the same time, and then this circuit generates a stop signal upon the predetermined count time reached and sends the stop signal to the multi-channel photon digital counting circuit, that terminates the counting operation and finally decides the photon count integrated value and the photon median point count value summation.

In this embodiment, the count time is defined to be 1 μs corresponding to three times of 0.3 μs, that is the life time of the short life-time component of the fluorescent light from ZnS:Ag fluorescent material, so that almost all the short life-time component of the fluorescent light may be utilized.

Next, the neutron incident position can be obtained by dividing the obtained photon median point summation by the photon count integrated value by using a division circuit.

By referring to FIG. 27, a calculation example for the median point calculation according to the present invention now will be described. In the calculation example below, assume that the fluorescent lights enter 5 (five) wavelength shifting fibers at the fiber positions 3 to 5. At first, the integrated count value A obtained by counting for the single neutron by using the wavelength shifting fibers is obtained by summing the count values at the positions 3 to 7, which makes 11 in this calculation example.

Next, the median point calculation summation B is obtained. The position number values from 3 to 7 are generated by the synchronized photon signals corresponding to the fiber positions 3 to 7, respectively. The individual generated position number values are made input to the position number value integrating circuit, in which the median point calculation summation B is obtained as 54 by summing its input values as shown in the figure. The neutron incident position obtained in case of applying the median point calculating method is defined as a quotient obtained by dividing the median point count value summation B by the integrated count value A, that is, B/A=54/11=4.9. In case of representing the coordinate value of the incident position in terms of integer number, position 5 is obtained as the incident position by round-off calculation. In case of an increased accuracy in the incident position, a real value of 4.9 may be used as the coordinate value of the incident position. The incident position obtained in this embodiment is identical to the result obtained in the embodiment referring to FIG. 3.

Owing to the above described configuration and process, it will be appreciated to provide such a one-dimensional neutron image detector or a two-dimensional neutron image detector as enabling to obtain the incident position by the median point calculation without using any complicated multiplying circuit and integrating circuit.

(Embodiment 8)

Figure 28:
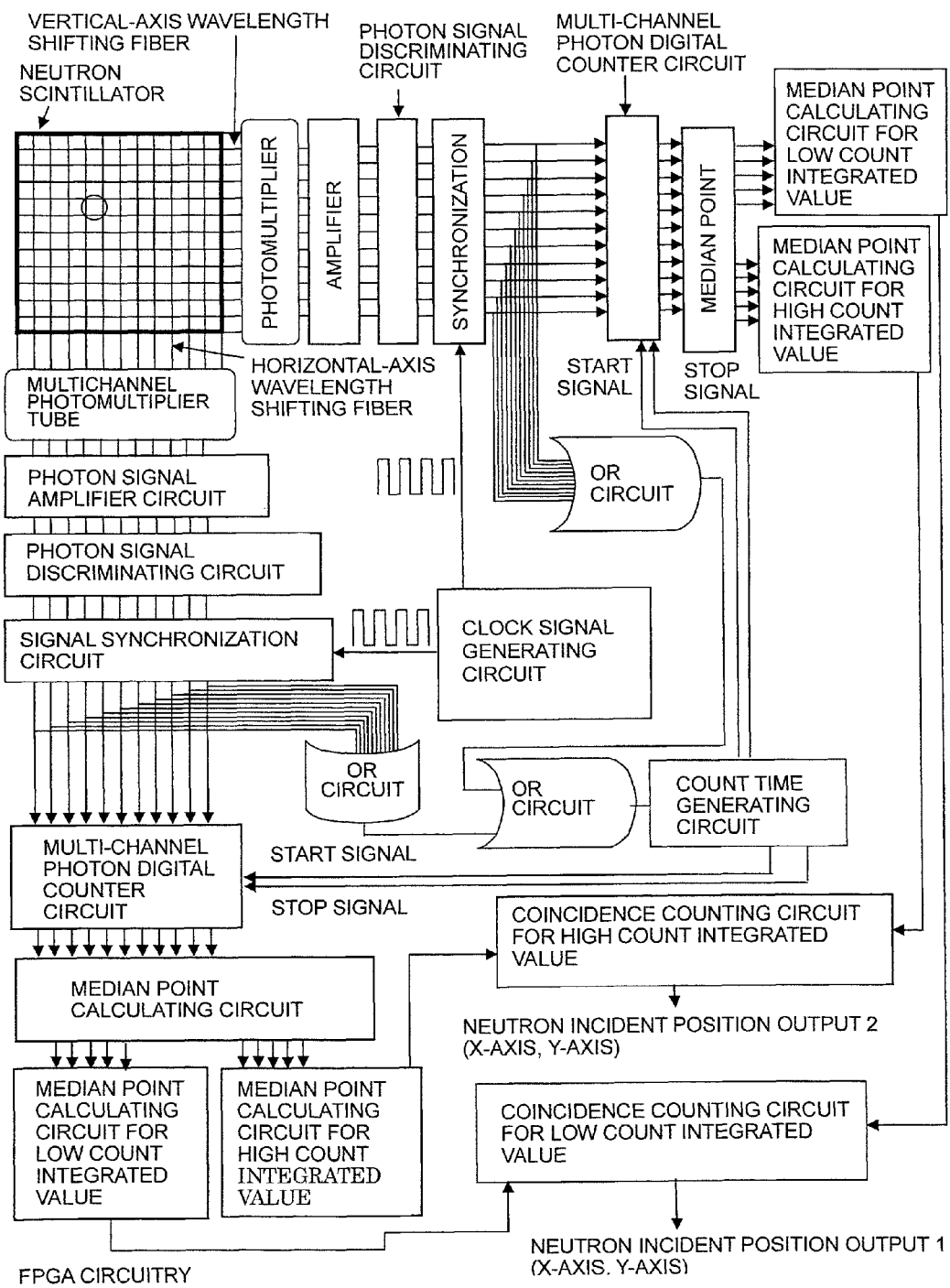
FIG. 28 is a schematic diagram showing the configuration of the median point calculating circuit in the neutron image detector having a semi-transparent scintillator and a wavelength shifting fiber.

As Embodiment 8, FIG. 28 illustrates a schematic diagram showing the configuration of the median point calculating circuit in the two-dimensional neutron image detector combining a semi-transparent scintillator manufactured by mixing ZnS:Ag fluorescent material, and $^6$LiF or $^{10}B_2O_3$ as a neutron converter and a wavelength shifting fiber according to the present invention. FIG. 15A and FIG. 15B show flow charts of the median point calculation in case that, assuming a couple of neutrons incident simultaneously, in which one neutron having a higher intensity of the fluorescent light, that is, a larger integrated number of photons is defined as "Neutron 1" and the other neutron is defined as "neutron 2", the fluorescent light corresponding to Neutron 1 incident into five wavelength shifting fibers for the vertical axis and the horizontal axis, respectively, and the fluorescent light corresponding to Neutron 2 incident into three wavelength shifting fibers for the vertical axis and the horizontal axis, respectively, and then, those neutrons are discriminated.

The two-dimensional neutron image detector using a scintillator and a wavelength shifting fiber in this embodiment has the same structure as Embodiment 2. Note that the additional function including the signal synchronization circuit and its down stream in the present invention will be now described.

What will be described below is a case of using a semi-transparent scintillator as a neutron scintillator manufactured by mixing ZnS:Ag fluorescent material, and $^6$LiF or $^{10}B_2O_3$ as a neutron converter. The neutron detecting sheet commercially available from AST in England is used as the neutron scintillator, which is manufactured by using ZnS:Ag as fluorescent material, and mixing ZnS:Ag and $^6$LiF with a mixing ratio of 4:1 by binder material. The thickness of the neutron scintillator is 0.45 mm. FIG. 16 shows an example of the measurement result of the photon pulse-height distribution characteristics by detecting the fluorescent light from the neutron scintillator by the photomultiplier tube. It is proved that the number of photons to be used at the median point calculation distributes in the range almost in double-figures from 2 (two) to about 100 (one hundred) when the photon digital signal is generated upon the neutron incident detected by the wavelength shifting fiber, as this neutron scintillator is semi-transparent.

As the photons are detected at two positions in the vertical axis and the horizontal axis, respectively, at the neutron image detector in case that a couple of photons are generated simultaneously (within a time window for measuring photons) at distinctive positions, it is impossible to identify the detection positions, and thus the neutron signals are not provided in general. Therefore, counting loss may occur especially in case of the measurement with a higher counting rate.

In the present invention, in case of using ZnS:Ag as fluorescent material and $^6$LiF as a neutron converter, the number of generated photons upon the incident of a neutron is as many as 2 to 100. In case that the number of photons generated by the incident of a neutron varies from one neutron to another neutron when a couple of neutrons incident, the count values for the vertical axis and the horizontal axis for the individual neutrons are compared with each other, respectively, a group of count values having relatively larger values and a group of count values having relatively smaller values are identified respectively to correspond to the individual neutrons in order to discriminate a couple of neutrons.

Figure 29A:
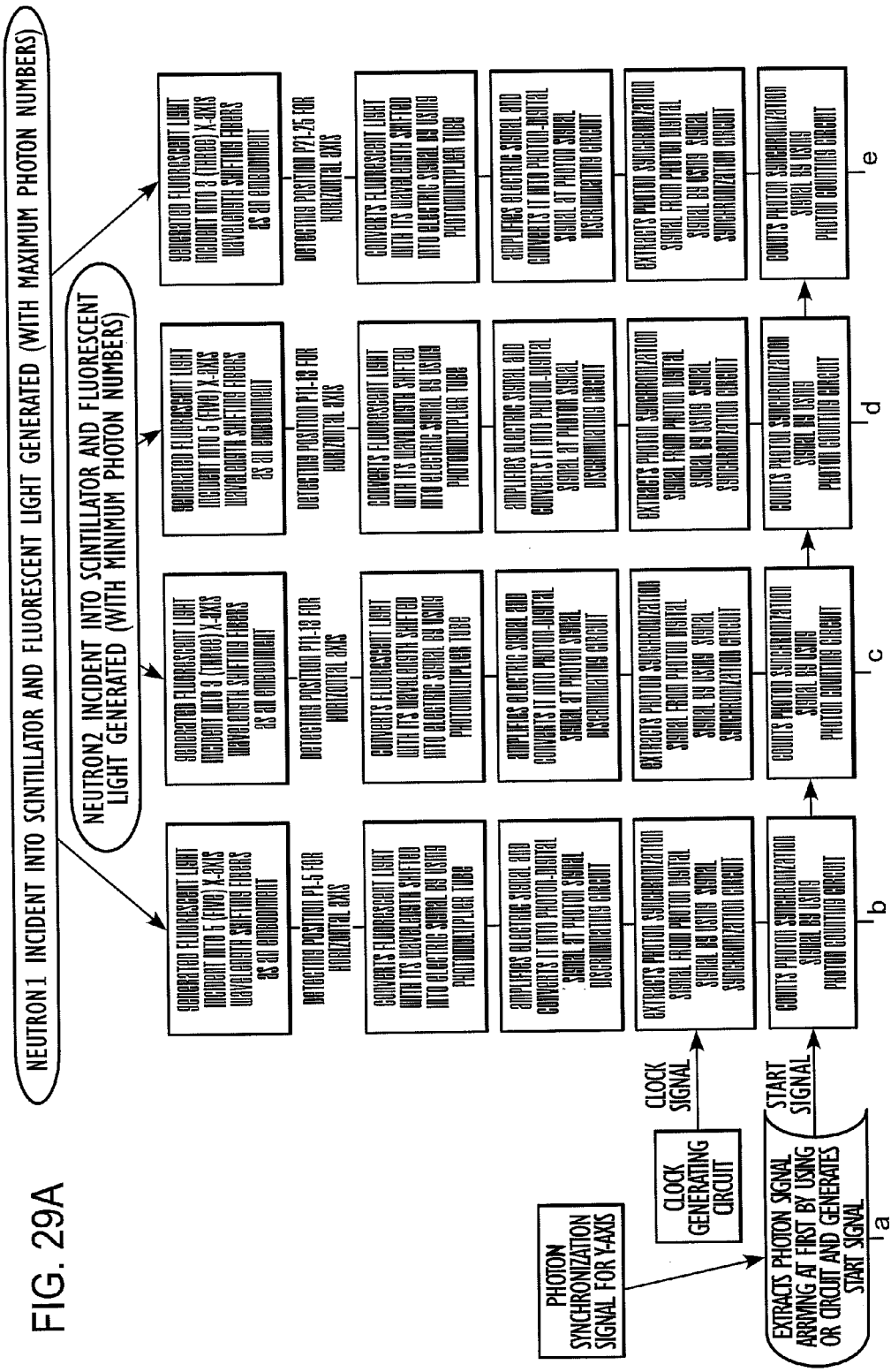
FIG. 29A is a first half of the flow chart of the operation in the median point calculating circuit shown in FIG. 28.
Figure 29B:
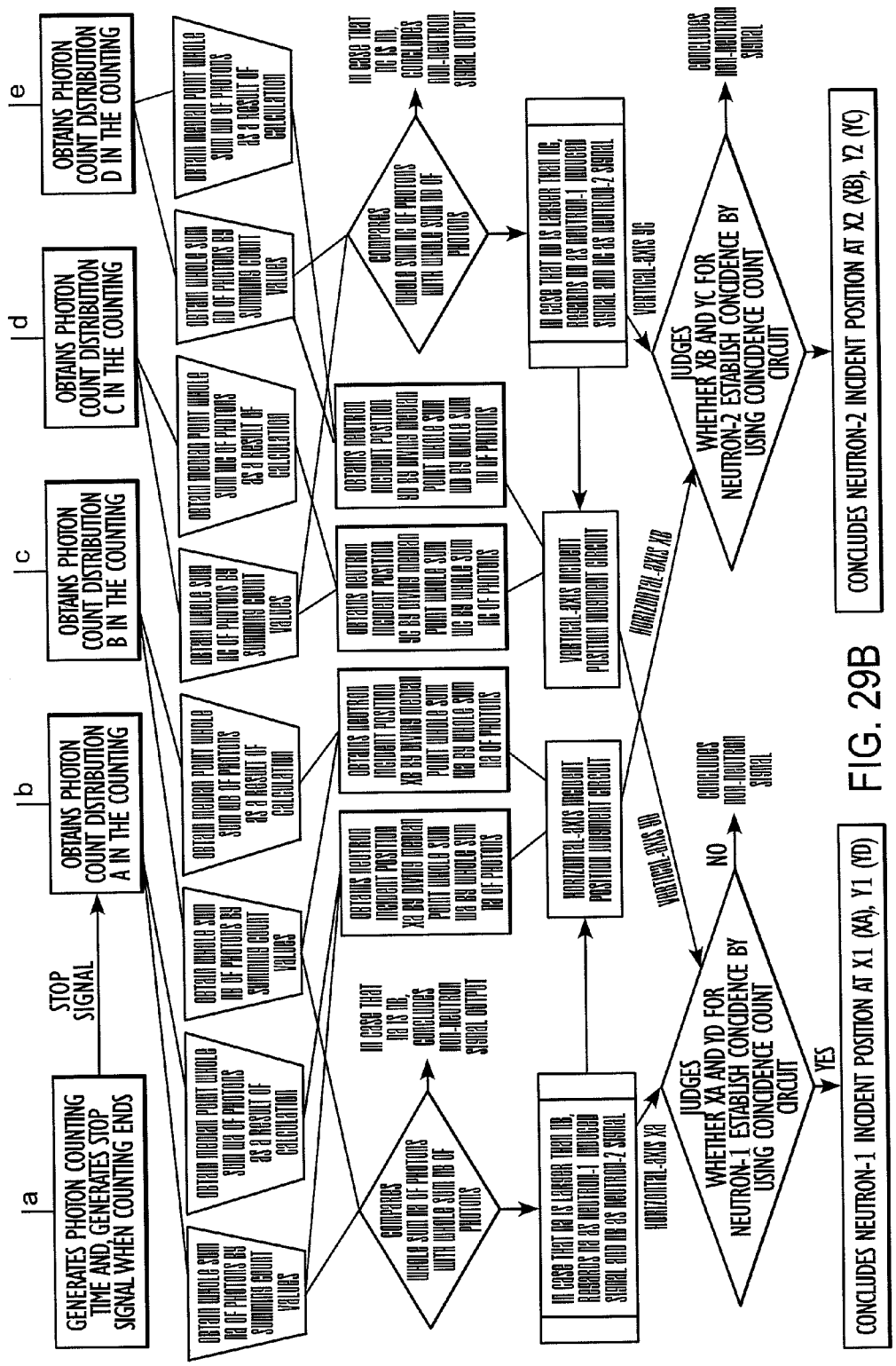
FIG. 29B is a last half of the flow chart thereof.

In this embodiment, by referring to FIG. 29A and FIG. 29B, a flow of the median point calculation by discriminating a couple of neutrons as well as the associated circuit operation will be described below.

Assume that a couple of neutrons, Neutron 1 and Neutron 2, incident simultaneously, and that the number of photons generated by Neutron 1 is larger than the number of photons generated by Neutron 2. Under those assumptions, the number of fibers detecting the photons generated by Neutron 1 in the horizontal axis and the vertical axis, respectively, is 5 (five), and the number of fibers detecting the photons generated by Neutron 2 in the horizontal axis and the vertical axis, respectively, is 3 (three).

In the subsequent processes, in the similar manner to Embodiment 2, the photon count-value distributions in the horizontal axis and the vertical axis, respectively can be obtained by using the multi-channel photon digital counting circuit. In this embodiment, a couple of neutron photon distributions associated with Neutron 1 and Neutron 2 are identified at the two distinctive positions in the photon count-value distribution in the horizontal axis. Similarly, a couple of neutron photon distributions associated with Neutron 1 and Neutron 2 are identified at the two distinctive positions in the photon count-value distribution in the vertical axis.

Next, the count values for the two incident positions in the horizontal axis are summed by using the horizontal-axis two-neutron judgment circuit, and then, the whole sum NA of photons and the whole sum NB of photons are obtained, respectively. By comparing the whole sum NA of photons with the whole sum NB of photons, the larger one is identified to be the count-value distribution due to Neutron 1, and the smaller one is identified to be the count-value distribution due to Neutron 2. In case that those whole sums are indistinctive or almost identical to each other, the neutron signal output is made NULL. In this embodiment, as the whole sum NA is larger than the whole sum NB, the whole sum NA is judged to be contributed by Neutron 1, and the whole sum NB is judged to be contributed by Neutron 2.

Similarly, the count values for the two incident positions in the vertical axis are summed by using the vertical-axis two-neutron judgment circuit, and then, the whole sum NC of photons and the whole sum ND of photons are obtained, respectively. By comparing the whole sum NC of photons with the whole sum ND of photons, the larger one is identified to be the count-value distribution due to Neutron 1, and the smaller one is identified to be the count-value distribution due to Neutron 2. In case that those whole sums are indistinctive or almost identical to each other, the neutron signal output is made NULL. In this embodiment, as the whole sum ND is larger than the whole sum NC, the whole sum ND is judged to be contributed by Neutron 1, and the whole sum NC is judged to be contributed by Neutron 2.

Next, using the median point calculating circuit for horizontal-axis high count integrated value and the median point calculating circuit for horizontal-axis low count integrated value, and dividing operation is applied to the median-point summation and the whole sum of photon count values, a couple of neutron incident positions XA and XB are obtained.

According to the judgment result described above, the neutron incident point XA is determined to be contributed by Neutron 1 and the neutron incident point XB is determined to be contributed by Neutron 2.

Next, using the median point calculating circuit for vertical-axis high count integrated value and the median point calculating circuit for vertical-axis low count integrated value, and dividing operation is applied to the median-point summation and the whole sum of photon count values, a couple of neutron incident positions YC and YD are obtained. According to the judgment result described above, the neutron incident point YD is determined to be contributed by Neutron 1 and the neutron incident point YC is determined to be contributed by Neutron 2.

In order to verify the coincidence of the neutron incident positions XA and YC, both being contributed by Neutron 1 associated with a larger number of photons, the coincidence measurement is performed by using the coincidence counting circuit. If their coincidence is verified to be valid, the neutron incident position signal (X1, Y1) is provided as Neutron 1 signal, and if their coincidence is verified to be invalid, then the neutron incident position signal is not provided. The coincidence count time (coincidence time) is defined to be 1 μs corresponding to three times of 0.3 μs, that is the life time of the short life-time component of the fluorescent light from ZnS:Ag fluorescent material.

In order to verify the coincidence of the neutron incident positions XB and YD, both being contributed by Neutron 2 associated with a smaller number of photons, the coincidence measurement is performed by using the coincidence counting circuit. If their coincidence is verified to be valid, the neutron incident position signal (X2, Y2) is provided as Neutron 2 signal, and if their coincidence is verified to be invalid, then the neutron incident position signal is not provided. The coincidence count time (coincidence time) is defined to be 1 μs corresponding to three times of 0.3 μs, that is the life time of the short life-time component of the fluorescent light from ZnS:Ag fluorescent material.

Owing to the above described signal processing, as a couple of neutrons can be discriminated so as to provide their distinctive position signals upon a couple of neutrons incident simultaneously into the neutron image detector, it will be appreciated that such a detector with lower counting loss may be realized even if the neutron incident with a higher counting rate.

Although two wavelength shifting fibers has been arranged on one pixel in the examples described above, it becomes possible to realize a larger area detector and reduce the cost of a two-dimensional image detector as a whole by arranging three or more wavelength shifting fibers on one pixel and connecting them to photomultiplier tubes. In an example of three fibers, the first and third fibers are connected to photomultiplier tube 1, and the second fiber is connected to photomultiplier 2. Further, in an example of four fibers, the first and third fibers are connected to photomultiplier tube 1, and the second and fourth fibers are connected to photomultiplier 2. Even if five or more fibers are used, It is possible to construct a two-dimensional image detector in a similar manner.

What is claimed is:

1. A neutron image detection method for collecting a fluorescent light generated by a neutron incident at a designated position interval in one-dimensional geometry and determining an incident position of the neutron by detecting the collected fluorescent light, wherein the fluorescent light is detected by a photon counting method;

a pulse signal generated by an individual output photon is extracted on the basis of a clock signal generated with the same time interval as the time width of the pulse signal generated by a single photon;

a count-value distribution is obtained in terms of incident position as variable determined by a single neutron incident by counting the pulse signal output; and a neutron incident position is determined by calculating a median point on the basis of the obtained count-value distribution.

2. A neutron image detection method for collecting a fluorescent light generated by a neutron incident at a designated position interval on a vertical axis and a horizontal axis, respectively, in two-dimensional geometry and determining an incident position of the neutron by detecting the collected fluorescent light, wherein the fluorescent light is detected by a photon counting method;

a pulse signal generated by an individual photon is extracted on the basis of a clock signal generated with the same time interval as the time width of the pulse signal generated by a single photon;

a count-value distribution is obtained on a vertical axis and a horizontal axis, respectively, in terms of incident position as variable determined by a single neutron incident by counting the pulse signal output; and a neutron incident position is determined on a vertical axis and a horizontal axis, respectively, by calculating a median point on a vertical axis and a horizontal axis, respectively, on the basis of the obtained count-value distribution.

3. A neutron image detection method for collecting a fluorescent light from a scintillator generating a fluorescent light upon a neutron incident at a designated position interval on a vertical axis and a horizontal axis, respectively, in two-dimensional geometry and determining an incident position of the neutron by detecting the collected fluorescent light or detecting the fluorescent light directly in two-dimensional geometry wherein the fluorescent light is detected by a photon counting method;

a pulse signal generated by an individual photon is extracted on the basis of a clock signal generated with the same time interval as the time width of the pulse signal generated by a single photon;

a two-dimensional count-value distribution is obtained in terms of incident position as variable determined by a single neutron incident by counting the pulse signal output, or obtained by detecting directly the fluorescent light; and a neutron incident position is determined on a vertical axis and a horizontal axis, respectively, on the basis of the obtained two-dimensional count-value distribution.

4. A neutron image detection method for collecting a fluorescent light from a scintillator generating a fluorescent light upon a neutron incident by using an optical fiber or a wavelength shifting fiber arranged at a designated position interval in parallel in one-dimensional geometry and determining an incident position of the neutron by detecting the collected fluorescent light or detecting the fluorescent light with its wavelength shifted wherein the fluorescent light is detected by a photon counting method;

a pulse signal generated by an individual photon is extracted on the basis of a clock signal generated with the same time interval as the time width of the pulse signal generated by a single photon;

a count-value distribution is obtained in terms of incident position relative to an individual optical fiber or an individual wavelength shifting fiber as variable determined by a single neutron incident by counting the pulse signal output by a counting circuit; and a neutron incident position is determined by calculating a median point on the basis of the obtained count-value distribution.

5. The neutron image detector enabling to change a discrimination level of a neutron signal using a method according to claim 4, wherein, when a pulse signal is extracted on the basis of a clock signal generated with the same time interval as the time width of the pulse signal generated by a single photon, and a generated pulse signal is counted by a counting circuit, the pulse signal obtained in synchronized with the used clock signal is counted during a designated count time;

an integrated count value for a horizontal-axis count distribution and an integrated count value for a vertical-axis count distribution are obtained;

a horizontal-axis signal is made valid if the integrated count value for the horizontal axis is equal to or greater than a preset discrimination value for the horizontal axis, and a vertical-axis signal is made valid if the integrated count value for the vertical axis is equal to or greater than a preset discrimination value for the vertical axis; and the neutron signal is made output if and only if both the horizontal-axis signal and the vertical-axis signal are valid.

6. The neutron image detector using a method according to claim 4, comprising a circuit for adding a predetermined number of pulse signals according to the number of consecutive pulse signals so that a neutron incident position may be determined by compensating the non-linearity in the photon counting method in case of counting multiple photons simultaneously if the pulse signal obtained in synchronized with the used clock signal is consecutive when a pulse signal is extracted on the basis of a clock signal generated with the same time interval as the time width of the pulse signal generated by a single photon, and a generated pulse signal is counted by a counting circuit.

7. The neutron image detector using a method according to claim 4, wherein in case of using a semi-transparent scintillator manufactured by mixing ZnS:Ag fluorescent material, and $^6$LiF or $^{10}B_2O_3$ as a neutron converter, by using such a characteristic as a population of fluorescent light emitted responsive to a single neutron incident distributes widely owing to semi-transparent feature of the scintillator, a count-value distribution on a vertical axis and a horizontal axis, respectively is obtained relative to an individual optical fiber or an individual wavelength shifting fiber upon a neutron incident into the scintillator;

an integrated count value for a horizontal-axis count distribution and an integrated count value for a vertical-axis count distribution are obtained on the basis of the obtained count-value distribution, and then whole sum of count values is calculated as a sum of the integrated count value for the horizontal axis and the integrated count value for the horizontal axis; and a counting operation by a count circuit is made suspended during a time period predetermined on the basis of the whole sum of count values so that multiple countings due to after-glow in ZnS:Ag fluorescent material may be removed.

8. The neutron image detector using a method according to claim 4, wherein the fluorescent light is detected by photon counting method;

a pulse signal generated by an individual photon output from an light detector corresponding to an individual detection position is extracted on the basis of a clock signal generated with the same time interval as the time width of the pulse signal generated by a single photon, and defined to be a synchronization signal;

a whole sum of photon count values is obtained by integrating the synchronization signal at the individual position, and at the same time, a position number value corresponding to the individual position is made generated by the synchronization signal for the individual position;

a whole sum of a medium point calculation value is obtained by integrating the generated position number values; and a median position is obtained by dividing the obtained whole sum of a medium point calculation value by a whole sum of photon calculation values.

9. A neutron image detection method for collecting a fluorescent light from a scintillator generating a fluorescent light upon a neutron incident by using an optical fiber or a wavelength shifting fiber arranged at a designated position interval on a vertical axis and a horizontal axis, respectively, in parallel in two-dimensional geometry, making one fluorescent light amount a value collected for the vertical axis and making the other fluorescent light amount a value collected for the horizontal axis orthogonal to the vertical axis of the optical fiber or the wavelength shifting fiber, and determining an incident position of the neutron by detecting the fluorescent light collected by the optical fiber or the wavelength shifting fiber on the vertical axis and the horizontal axis by using a vertical light detector and a horizontal light detector wherein the fluorescent light is detected by photon counting method;

a pulse signal generated by an individual photon output by the individual light detector is extracted on the basis of a clock signal generated with the same time interval as the time width of the pulse signal generated by a single photon;

a count-value distribution is obtained on a vertical axis and a horizontal axis, respectively, in terms of incident position relative to an individual optical fiber or an individual wavelength shifting fiber as variable determined by a single neutron incident by counting the pulse signal output by a counting circuit; and a neutron incident position is determined on a vertical axis and a horizontal axis, respectively, by calculating a median point on a vertical axis and a horizontal axis, respectively, on the basis of the obtained count-value distribution.

10. The neutron image detector using a method according to claim 9, wherein in case of using a semi-transparent scintillator manufactured by mixing ZnS:Ag fluorescent material, and $^6$LiF or $^{10}B_2O_3$ as a neutron converter, by using such a characteristic as a population of fluorescent light emitted responsive to a single neutron incident distributes widely owing to semi-transparent feature of the scintillator, upon a couple of neutrons incident simultaneously into distinctive positions at the two-dimensional neutron image detector during a predetermined count time, an integrated count number of vertical-axis count-number distribution and an integrated count number of horizontal-axis count-number distribution are obtained, and then a vertical-axis incident position and a horizontal-axis incident position, respectively, of a couple of neutrons incident simultaneously are determined separately by combining a larger vertical-axis integrated count number with a larger horizontal-axis integrated count number, and combining a smaller vertical-axis integrated count number with a smaller horizontal-axis integrated count number.

11. A neutron image detection method for collecting a fluorescent light from a scintillator generating a fluorescent light upon a neutron incident by using an optical fiber or a light guide arranged at a designated position interval on a vertical axis and a horizontal axis, respectively, in parallel in two-dimensional geometry, and determining an incident position of the neutron by detecting the collected fluorescent light by a light detector arranged in two-dimensional geometry or detecting the fluorescent light directly by a two-dimensional light detector wherein the fluorescent light is detected by a photon counting method;

a pulse signal generated by an individual photon is extracted on the basis of a clock signal generated with the same time interval as the time width of the pulse signal generated by a single photon;

a two-dimensional count-value distribution is obtained in terms of incident position relative to an individual optical fiber or an individual wavelength shifting fiber as variable determined by a single neutron incident by counting the pulse signal output by a counting circuit, or obtained by detecting the fluorescent light directly by the two-dimensional light detector; and a neutron incident position is determined on a vertical axis and a horizontal axis, respectively, on the basis of the obtained two-dimensional count-value distribution.

* * * * *